(12) United States Patent
Kostromine et al.

(10) Patent No.: US 11,640,136 B2
(45) Date of Patent: May 2, 2023

(54) SYSTEM CONSISTING OF TWO UV-CURING DRY-TRANSFER COATING LAYERS FOR THE PROTECTION OF A HOLOGRAM IN A PHOTOPOLYMER FILM COMPOSITE

(71) Applicant: Covestro Deutschland AG, Leverkusen (DE)

(72) Inventors: Serguei Kostromine, Swisttal-Buschhoven (DE); Thomas Rölle, Leverkusen (DE); Thomas Fäcke, Leverkusen (DE); Karl Vetterle, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 682 days.

(21) Appl. No.: 16/611,407

(22) PCT Filed: May 7, 2018

(86) PCT No.: PCT/EP2018/061709
§ 371 (c)(1),
(2) Date: Nov. 6, 2019

(87) PCT Pub. No.: WO2018/206498
PCT Pub. Date: Nov. 15, 2018

(65) Prior Publication Data
US 2020/0166889 A1 May 28, 2020

(30) Foreign Application Priority Data
May 9, 2017 (EP) .................................... 17170206

(51) Int. Cl.
*G03H 1/02* (2006.01)
*G11B 7/24044* (2013.01)
*G11B 7/254* (2013.01)
*B32B 27/30* (2006.01)

(52) U.S. Cl.
CPC ........ *G03H 1/0252* (2013.01); *G03H 1/0248* (2013.01); *G03H 1/0256* (2013.01); *G11B 7/24044* (2013.01); *G11B 7/254* (2013.01); *B32B 27/308* (2013.01); *B32B 2310/0831* (2013.01); *B32B 2310/0837* (2013.01); *B32B 2333/04* (2013.01); *G03H 2250/39* (2013.01)

(58) Field of Classification Search
CPC ........ B32B 1/00; B32B 15/088; B32B 15/09; B32B 17/06; B32B 23/044; B32B 23/08; B32B 23/20; B32B 2307/412; B32B 2333/04; B32B 2333/12; B32B 2429/00; B32B 2457/20; B32B 2457/204; B32B 2457/206; B32B 21/08; B32B 2255/06; B32B 2255/08; B32B 2258/10; B32B 2307/51; B32B 2307/546; B32B 2307/702; B32B 2307/732; B32B 2551/00; B32B 27/06; B32B 27/08; B32B 27/20; B32B 27/302; B32B 27/304; B32B 2255/26; B32B 2270/00; B32B 23/04; B32B 23/042; B32B 2307/75; B32B 2310/0831; B32B 2310/0837; B32B 2329/06; B32B 27/306; B32B 27/308; B32B 27/32; B32B 27/325; B32B 27/34; B32B 27/36; B32B 27/365; B32B 27/38; B32B 27/40; B32B 7/12; C08F 2/50; G03H 1/0248; G03H 1/0252; G03H 1/0256; G03H 2001/186; G03H 2250/35; G03H 2250/39; G03H 2260/12; G11B 2007/25402; G11B 7/24044; G11B 7/254
USPC ..... 156/60, 242, 272.2, 273.3, 273.5, 275.5, 156/307.1; 359/15, 3
See application file for complete search history.

(56) References Cited

U.S. PATENT DOCUMENTS

| | | |
|---|---|---|
| 4,185,009 A | 1/1980 | Idel et al. |
| 4,913,971 A | 4/1990 | Beck et al. |
| 4,994,347 A | 2/1991 | Smothers |
| 5,235,026 A | 8/1993 | Wulff et al. |
| 5,367,044 A | 11/1994 | Rosenquist |
| 6,075,626 A | 6/2000 | Mizutani et al. |
| 6,228,973 B1 | 5/2001 | McCloskey et al. |
| 6,586,556 B2 | 7/2003 | Kratschmer et al. |
| 6,613,869 B1 | 9/2003 | Horn et al. |
| 7,241,494 B2 | 7/2007 | Koeniger et al. |
| 7,304,172 B2 | 12/2007 | Coates et al. |
| 7,425,358 B2 | 9/2008 | Heuer et al. |
| 7,547,755 B2 | 6/2009 | Heuer |
| 8,754,144 B2 | 6/2014 | Jayasuriya |

(Continued)

FOREIGN PATENT DOCUMENTS

| | | |
|---|---|---|
| CN | 101373609 A | 2/2009 |
| CN | 104395960 A | 3/2015 |

(Continued)

OTHER PUBLICATIONS

International Search Report for PCT/EP2018/061709 dated Aug. 9, 2018.

(Continued)

*Primary Examiner* — Philip C Tucker
*Assistant Examiner* — Brian R Slawski
(74) *Attorney, Agent, or Firm* — The Webb Law Firm

(57) ABSTRACT

The invention relates to a sealed holographic medium comprising a layer construction B'-C1'-C2', to a process for producing the sealed holographic medium, to a kit of parts, to a layer construction comprising a protective layer and a substrate layer and to the use thereof.

14 Claims, No Drawings

(56) References Cited

U.S. PATENT DOCUMENTS

| | | |
|---|---|---|
| 8,771,903 B2 | 7/2014 | Hönel et al. |
| 8,889,322 B2 | 11/2014 | Weiser et al. |
| 9,057,946 B2 | 6/2015 | Fäcke et al. |
| 9,073,296 B2 | 7/2015 | Fäcke et al. |
| 9,098,065 B2 | 8/2015 | Hönel et al. |
| 9,195,215 B2 | 11/2015 | Weiser et al. |
| 9,261,778 B2 | 2/2016 | Weiser et al. |
| 9,804,490 B2 | 10/2017 | Rölle et al. |
| 10,241,402 B2 | 3/2019 | Rölle et al. |
| 2003/0134105 A1 | 7/2003 | Toshine et al. |
| 2005/0112971 A1 | 5/2005 | Panse |
| 2011/0318567 A1 | 12/2011 | Hildenbrand et al. |
| 2012/0165549 A1 | 6/2012 | Ok et al. |
| 2012/0286504 A1 | 11/2012 | Oikawa et al. |
| 2013/0182301 A1 | 7/2013 | Tsukada et al. |
| 2013/0224634 A1 | 8/2013 | Berneth et al. |
| 2015/0048259 A1 | 2/2015 | Yamamoto et al. |
| 2016/0002487 A1 | 1/2016 | Weiser et al. |
| 2016/0115322 A1 | 4/2016 | Kostromine et al. |

FOREIGN PATENT DOCUMENTS

| | | | |
|---|---|---|---|
| CN | 105122368 A | 12/2015 | |
| DE | 1031512 B | 6/1958 | |
| DE | 2500092 A1 | 7/1976 | |
| DE | 2902090 A1 | 7/1980 | |
| DE | 3702394 A1 | 7/1988 | |
| DE | 3729068 A1 | 3/1989 | |
| DE | 4240313 A1 | 6/1994 | |
| DE | 19943642 A1 | 3/2001 | |
| EP | 0081713 A2 | 6/1983 | |
| EP | 0223587 A1 | 5/1987 | |
| EP | 0517044 A2 | 12/1992 | |
| EP | 0949547 A2 * | 10/1999 | |
| EP | 1359177 A1 | 11/2003 | |
| EP | 1506249 A1 | 2/2005 | |
| EP | 1582549 A1 | 10/2005 | |
| EP | 2613318 A1 | 7/2013 | |
| EP | 2772917 A1 | 9/2014 | |
| EP | 2786378 A1 | 10/2014 | |
| EP | 2962302 A1 | 1/2016 | |
| JP | S49125380 A | 11/1974 | |
| JP | 01-049078 A | 2/1989 | |
| JP | 09-005526 A | 1/1997 | |
| JP | 2000-132072 A | 5/2000 | |
| JP | 2000-137427 A | 5/2000 | |
| JP | 2000-200025 A | 7/2000 | |
| JP | 2002358018 A | 12/2002 | |
| JP | 2003-220662 A | 8/2003 | |
| JP | 2005-035237 A | 2/2005 | |
| JP | 2005-161691 A | 6/2005 | |
| JP | 2005-162271 A | 6/2005 | |
| JP | 2006023455 A | 1/2006 | |
| JP | 2006023456 A | 1/2006 | |
| JP | 4293433 B2 | 7/2009 | |
| JP | 2015-510526 A | 4/2015 | |
| JP | 2016-517530 A | 6/2016 | |
| SU | 519417 A1 | 6/1976 | |
| WO | WO-9925775 A1 * | 5/1999 | ............. B32B 27/08 |
| WO | WO-02026862 A1 | 4/2002 | |
| WO | WO-03095521 A1 | 11/2003 | |
| WO | WO-2005113639 A1 | 12/2005 | |
| WO | WO-2008037364 A1 | 4/2008 | |
| WO | WO-2011054797 A1 | 5/2011 | |
| WO | WO-2011067057 A1 | 6/2011 | |
| WO | WO-2012020061 A1 | 2/2012 | |
| WO | WO-2012062655 A2 | 5/2012 | |
| WO | WO-2012062658 A1 | 5/2012 | |
| WO | WO-2013079422 A1 | 6/2013 | |
| WO | WO-2014131795 A1 | 9/2014 | |
| WO | WO-2015091427 A1 | 6/2015 | |
| WO | WO-2016091965 A1 | 6/2016 | |
| WO | 2016/116376 A1 | 7/2016 | |

OTHER PUBLICATIONS

International Search Report for PCT/EP2018/061715 dated Jul. 16, 2018.
International Search Report for PCT/EP2018/061826 dated Aug. 9, 2018.
International Search Report for PCT/EP2018/061828 dated Jul. 19, 2018.
Written Opinion of the International Searching Authority for PCT/EP2018/061709 dated Aug. 9, 2018.
Written Opinion of the International Searching Authority for PCT/EP2018/061715 dated Jul. 16, 2018.
Written Opinion of the International Searching Authority for PCT/EP2018/061826 dated Aug. 9, 2018.
Written Opinion of the International Searching Authority for PCT/EP2018/061828 dated Jul. 19, 2018.

* cited by examiner

SYSTEM CONSISTING OF TWO UV-CURING DRY-TRANSFER COATING LAYERS FOR THE PROTECTION OF A HOLOGRAM IN A PHOTOPOLYMER FILM COMPOSITE

CROSS-REFERENCE TO RELATED APPLICATIONS

This application is a national stage application (under 35 U.S.C. § 371) of PCT/EP2018/061709, filed May 7, 2018, which claims benefit of European Application No. 17170206.1, filed May 9, 2017, both of which are incorporated herein by reference in their entirety.

The invention relates to a sealed holographic medium comprising a layer construction B'-C1'-C2', to a process for producing the sealed holographic medium, to a kit of parts, to a layer construction comprising a protective layer and a substrate layer and to the use thereof.

Photopolymer layers for producing holographic media are known per se, for example from WO 2011/054797 and WO 2011/067057. Advantages of these holographic media are their high light diffraction efficiency and simplified processing since after holographic irradiation no further chemical and/or thermal development steps are necessary.

The holographic film (Bayfol® HX from Covestro Deutschland AG) consists of a film substrate (A) and a light sensitive photopolymer layer (B). Optical holograms are formed in the layer (B) by local photopolymerization and fixed by areal UV-VIS irradiation. Thus layer (B) forms a no-longer-photosensitive, through-polymerized layer (B') comprising a previously inscribed hologram. While this hologram is per se very stable over time, its properties can change as a result of mechanical influences and/or contact with for example organic substances (solvents).

Conceivable methods of protection are laquering, laminating, adhesive affixing of a protective layer and/or a protective film. However, classical lacquering or adhesive affixing gives rise to manifold problems associated with liquid lacquer and/or adhesive components which on contact with the (B') layer completely destroy the hologram or on account of severe optical shift render it useless.

Patent application EP 2613318 B1 describes that by suitable selection of the components protective layers can be applied atop an irradiated photopolymer layer. These protective layers are producible by reaction of at least one radiation-curable resin I), an isocyanate-functional resin II) and a photoinitiator system III). The protective layers described in EP 2613318 B1 meet the requirements for a suitable protective layer since they make it possible after application to provide a layer construction comprising a protective layer and an irradiated photopolymer layer which may be securely joined to a very wide variety of adjacent layers such as for example adhesive layers without resulting in a volume change in the photopolymer layer and an accompanying colour change of the hologram. However, the protective layer is applied atop the photopolymer layer in a "wet" state, i.e. as a solution or dispersion. However in industrial practice it is complex and costly to construct appropriate liquid application plants and provide personnel to monitor the coating process. Lamination processes are therefore preferred but have the disadvantage that they often result in film composites having insufficient adhesion.

Patent applications JP2006023455 (A) and JP2006023456 (A) describe a medium for recording holograms comprising a substrate layer, a photopolymer layer and one or two protective layers. The protective layer is adhesively bonded to the substrate layer, thus embedding the photopolymer layer between the substrate layer and the protective layer without itself being adhesively bonded to the two layers. These protected holographic media are preferably employed in ID cards. For most applications of holographic media where high demands in terms of uniformity and quality apply for the entire surface area of the holographic medium such a layer construction is difficult or even impossible to realize.

Some applications place such high demands on the protective layer, especially in terms of scratch and solvent resistance in combination with flexibility, elasticity and good adhesion, that it is difficult to satisfy all of the demands with one protective layer.

The problem addressed by the present invention is accordingly that of providing for irradiated photopolymer films not requiring post-processing steps after holographic irradiation a solution by which these may be sealed in simple processing steps without generating a disadvantageous colour shift of more than 10 mm, preferably of more than 5 mm, an exceptional adhesion between the photopolymer and the protective layer is ensured and the cured protective layer ensures permanent resistance against commonly used organic solvents, aqueous acids and alkalis, cosmetics, household and industrial cleaning compositions and/or sufficient scratch resistance against mechanical influences.

The problem is solved by a sealed holographic medium comprising a layer construction B'-C1'-C2', wherein B' is a photopolymer layer containing a volume hologram, C1' is a protective layer at least partly cured by actinic radiation obtainable by reaction of I) at least one thermoplastic mainly linear and semicrystalline polyurethane resin C1-1,
II) at least one multifunctional acrylate reactive diluent C1-II,
III) at least one photoinitiator C1-III and
IV) optionally assistant and added substances and C2' is a protective layer at least partly cured by actinic radiation obtainable by reaction of
I) at least one thermoplastic resin C2-I selected from the group consisting of polyvinyl butyral and polymethyl methacrylate,
II) at least one multifunctional acrylate reactive diluent C2-II,
III) at least one photoinitiator C2-III and
IV) optionally assistant and added substances.

The photopolymer layer B' is a photopolymer layer in which a hologram, preferably a volume hologram, has been photoinscribed and this hologram has then been fixed by areal broadband UV/VIS irradiation; the fixing is preferably effected with a light energy dose of 5-10 J/cm$^2$.

The advantage of the holographic medium according to the invention is that the photopolymer layer with the photoinscribed hologram is encapsulated by this protective layer combination, wherein the components B', C1, C1', C2 and C2' are matched to one another such that they not only allow good adhesion but also simultaneously ensure frequency stability/grating stability of the hologram and protection from chemical, physical and mechanical stress. In addition the sealing layers achieve compatibility with further layers and also bring about generally improved handleability of the hologram, for instance protection against dust by inhibiting residual tack or via an antistatic finish to the sealing layer. The two protective layers C1 and C2 have different jobs to do. The protective layer C1 which is directly joined to the photopolymer layer B is applicable to the B' layer of the substrate layer D1, neutral toward the hologram, i.e. causes no deterioration in the intensity of the hologram and no spectral shift of the reflection maximum. Furthermore the cured protective layer C1' adheres securely to the two adjacent layers, i.e. to the photopolymer layer B' and to the cured protective layer C2'. The second protective layer C2 which is joined to the protective layer C1 is conceived such that it may be applied atop the uncured layer C1, for example by lamination, and in the uncured and cured state adheres well to the protective layer C1/C1'. The cured protective layer C2' has good solvent and scratch resistance. The combination of the two protective layers C1 and C2 protects the hologram-containing photopolymer layer B' against physical and chemical influences, such as scratch and solvent damage, coupled with good adhesion of the layers of the construction to one another and flexibility and elasticity of the sealed holographic medium.

Reactive diluents in the context of the invention are preferably compounds which reduce the starting viscosity of the curable composition and in the course of the curing of the curable composition form a chemical bond with the thermoplastic resin and curing agent to form a network.

The term "functional" in the context of the invention in connection with acrylates is to be understood as meaning the number of respective radiation-curable, in particular UV-VIS radiation-curable, reactive groups, preferably in the form of double bonds. The radiation-curable groups are in particular acrylate groups. A "multifunctional acrylate" is accordingly to be understood as meaning a molecule having at least more than one radiation-curable group, in particular acrylate groups, and for example a "trifunctional acrylate" is to be understood as meaning a molecule having three radiation-curable groups, in particular acrylate groups. The radiation-curable groups are in particular free-radically polymerizable groups, such as the acrylate group.

The term "areal" in the context of the invention is to be understood as meaning a configuration as a planar area or else as a concavely or convexly vaulted or undulating area. In the context of the invention the hologram-containing photopolymer B' must have a planar, vaulted or undulating area in order that lamination with the sealing layer is made possible in the hologram region at least.

The word "a" in the context of the present invention in connection with countable parameters is to be understood as meaning the number "one" only when this is stated explicitly (for instance by the expression "precisely one"). When reference is made hereinbelow for example to "a polyisocyanate" the word "a" is to be understood as meaning merely the indefinite article and not the number one, this also encompasses an embodiment in which two or more, for example structurally dissimilar, polyisocyanates are present.

In a further preferred embodiment the layer construction according to the invention consists of at least four layers at least partly joined to one another, wherein the layers are arranged directly atop one another in the sequence substrate layer A, photopolymer layer B', cured protective layer C1' and cured protective layer C2'.

In a further preferred embodiment the layer construction according to the invention consists of at least four layers at least partly joined to one another, wherein the layers are arranged directly atop one another in the sequence photopolymer layer B', cured protective layer C1', cured protective layer C2' and substrate layer D2.

In a further preferred embodiment the layer construction according to the invention consists of at least five layers at least partly joined to one another, wherein the layers are arranged directly atop one another in the sequence substrate layer A, photopolymer layer B', cured protective layer C1', cured protective layer C2' and substrate layer D2.

The substrate layers A and D2 in the abovementioned embodiments of the layer construction according to the invention are preferably transparent thermoplastic films. In some embodiments the substrate layer A may also be made of another support material, for example glass or various plastics.

In a further preferred embodiment the protective layer C1 has a thickness of 1 to 100 μm, preferably of 2 to 50 μm and very particularly preferably of 3 to 25 μm.

In a further preferred embodiment the protective layer C2 has a thickness of 1 to 100 μm, preferably of 2 to 50 μm and very particularly preferably of 3 to 25 μm.

In a further preferred embodiment the protective layer C1 and/or the protective layer C2 contains a UV absorber, preferably in an amount of 0.01% to 10% by weight, more preferably in an amount of 0.1% to 5% by weight, in each case based on the total weight of the protective layer C1/C2.

In a further preferred embodiment the sealed holographic medium according to the invention comprises a layer construction B'-C1'-C2', wherein B' is a photopolymer layer containing a volume hologram, C1' is a protective layer at least partly cured by actinic radiation obtainable by reaction of I) at least one thermoplastic mainly linear and semicrystalline polyurethane resin C1-I, II) at least one multifunctional acrylate reactive diluent C1-II selected from the group consisting of phosphorothioyltris(oxybenzene-4,1-diylcarbamoyloxyethane-2,1-diyl) trisacrylate, dipentaerythritol pentaacrylate and dipentaerythritol hexaacrylate, III) at least one photoinitiator C1-III and IV) optionally assistant and added substances and C2' is a protective layer at least partly cured by actinic radiation obtainable by reaction of I) at least one thermoplastic resin C2-I selected from the group consisting of polyvinyl butyral and polymethyl methacrylate, II) at least one multifunctional acrylate reactive diluent C2-II selected from the group consisting of phosphorothioyltris(oxybenzene-4,1-diylcarbamoyloxyethane-2,1-diyl) trisacrylate, pentaerythritol triacrylate and quadruply ethoxylated pentaerythritol tetraacrylate, III) at least one photoinitiator C2-III and IV) optionally assistant and added substances.

The present invention likewise provides a layer construction comprising a curable protective layer C1 and an areal substrate layer D1 at least partly joined to the protective layer C1, characterized in that the protective layer C1 comprises I) at least one thermoplastic mainly linear and semicrystalline polyurethane resin C1-I, II) at least one multifunctional acrylate reactive diluent C1-II, III) at least one photoinitiator C1-III and IV) optionally assistant and added substances.

In a further preferred embodiment the layer construction according to the invention comprises a curable protective layer C1 and an areal substrate layer D1 at least partly joined to the protective layer C1, characterized in that the protective layer C1 comprises I) at least one thermoplastic mainly linear and semicrystalline polyurethane resin C1-I, II) at least one multifunctional acrylate reactive diluent C1-II selected from the group consisting of phosphorothioyltris(oxybenzene-4,1-diylcarbamoyloxyethane-2,1-diyl) trisacrylate, dipentaerythritol pentaacrylate and dipentaerythritol hexaacrylate, III) at least one photoinitiator C1-III and IV) optionally assistant and added substances.

In a further preferred embodiment the layer construction according to the invention comprises a curable protective layer C1 and an areal substrate layer D1 at least partly joined to the protective layer C1, characterized in that the protective layer C1 comprises I) at least one thermoplastic mainly linear and semicrystalline polyurethane resin C1-I, II) at least one multifunctional acrylate reactive diluent C1-II, III) at least one photoinitiator C1-III and IV) optionally assistant and added substances, wherein the substrate layer D1 is a polyester substrate, preferably a PET substrate, yet more preferably a silicone-modified PET substrate, having a film thickness of <200 µm, more preferably <100 µm and >20 µm, yet more preferably <45 µm and >20 µm.

In a further preferred embodiment the layer construction according to the invention comprises a curable protective layer C1 and an areal substrate layer D1 at least partly joined to the protective layer C1, characterized in that the protective layer C1 comprises I) at least one thermoplastic mainly linear and semicrystalline polyurethane resin C1-I, II) at least one multifunctional acrylate reactive diluent C1-II selected from the group consisting of phosphorothioyltris(oxybenzene-4,1-diylcarbamoyloxyethane-2,1-diyl) trisacrylate, dipentaerythritol pentaacrylate and dipentaerythritol hexaacrylate, III) at least one photoinitiator C1-III and IV) optionally assistant and added substances, wherein the substrate layer D1 is a polyester substrate, preferably a PET substrate, yet more preferably a silicone-modified PET substrate, having a film thickness of <200 µm, more preferably <100 µm and >20 µm, yet more preferably <45 µm and >20 µm.

The present invention likewise provides a layer construction comprising a curable protective layer C2 and an areal substrate layer D2 at least partly joined to the protective layer C2, characterized in that the protective layer C2 comprises I) at least one thermoplastic resin C2-I selected from the group consisting of polyvinyl butyral and polymethyl methacrylate, II) at least one multifunctional acrylate reactive diluent C2-II, III) at least one photoinitiator C2-III and IV) optionally assistant and added substances.

In a further preferred embodiment the layer construction according to the invention comprises a curable protective layer C2 and an areal substrate layer D2 at least partly joined to the protective layer C2, characterized in that the protective layer C2 comprises I) at least one thermoplastic resin C2-I selected from the group consisting of polyvinyl butyral and polymethyl methacrylate, II) at least one multifunctional acrylate reactive diluent C2-II selected from the group consisting of phosphorothioyltris(oxybenzene-4,1-diylcarbamoyloxyethane-2,1-diyl) trisacrylate, pentaerythritol triacrylate and quadruply ethoxylated pentaerythritol tetraacrylate, III) at least one photoinitiator C2-III and IV) optionally assistant and added substances.

In a further preferred embodiment the layer construction according to the invention comprises a curable protective layer C2 and an areal substrate layer D2 at least partly joined to the protective layer C2, characterized in that the protective layer C2 comprises I) at least one thermoplastic resin C2-I selected from the group consisting of polyvinyl butyral and polymethyl methacrylate, II) at least one multifunctional acrylate reactive diluent C2-II, III) at least one photoinitiator C2-III and IV) optionally assistant and added substances, wherein the substrate layer D2 is a polyester substrate, preferably a PET substrate, yet more preferably a trilayer coextrudate PET substrate, having a film thickness of <200 µm, more preferably <100 µm and >20 µm, yet more preferably <45 µm and >20 µm.

In a further preferred embodiment the layer construction according to the invention comprises a curable protective layer C2 and an areal substrate layer D2 at least partly joined to the protective layer C2, characterized in that the protective layer C2 comprises I) at least one thermoplastic resin C2-I selected from the group consisting of polyvinyl butyral and polymethyl methacrylate, II) at least one multifunctional acrylate reactive diluent C2-II selected from the group consisting of phosphorothioyltris(oxybenzene-4,1-diylcarbamoyloxyethane-2,1-diyl) trisacrylate, pentaerythritol triacrylate and quadruply ethoxylated pentaerythritol tetraacrylate, III) at least one photoinitiator C2-III and IV) optionally assistant and added substances, wherein the substrate layer D2 is a polyester substrate, preferably a PET substrate, yet more preferably a trilayer coextrudate PET substrate, having a film thickness of <200 µm, more preferably <100 µm and >20 µm, yet more preferably <45 µm and >20 µm.

The layer constructions C1-D1 and C2-D2 according to the invention may be used in the process according to the invention described below and may be part of the kit of parts according to the invention.

The invention likewise provides a process for producing the inventive sealed holographic medium, characterized in that initially an uncured protective layer C1 is applied atop a photopolymer layer B containing a volume hologram to afford a layer composite B'-C1, in a further step an uncured protective layer C2 is applied atop the protective layer C1 to afford a layer composite B'-C1-C2 and subsequently the layer composite B'-C1-C2 is cured with actinic radiation to obtain a layer composite B'-C1'-C2', wherein C1' and C2' are the cured protective layers C1 and C2 respectively, wherein the uncured protective layer C1 comprises I) at least one thermoplastic mainly linear and semicrystalline polyurethane resin C1-I, II) at least one multifunctional acrylate reactive diluent C1-II, III) at least one photoinitiator C1-III and IV) optionally assistant and added substances; and the uncured protective layer C2 comprises I) at least one thermoplastic resin C2-I selected from the group consisting of polyvinyl butyral and polymethyl methacrylate, II) at least one multifunctional acrylate reactive diluent C2-II, III) at least one photoinitiator C2-III and IV) optionally assistant and added substances.

The process according to the invention has the advantage that the protective layers C1 and C2 are applied "dry", thus avoiding provision of costly and complex machines and specially trained personnel as is required for example for "wet" application. The very good adhesion of the cured protective layers to one another and to the photopolymer layer ensures not only that the optionally present substrate layer D2 may be residuelessly peeled off but also ensures a permanent resistance against commonly used organic solvents, aqueous acids and alkalis, cosmetics, household and industrial cleaning compositions, and/or sufficient scratch resistance against mechanical influences.

In a preferred embodiment of the process according to the invention the photopolymer layer B' is disposed on a substrate layer A or another carrier, for example glass or plastic.

In a preferred embodiment of the process according to the invention the uncured protective layer C1 is disposed on a substrate layer D1 and the uncured protective layer C2 is disposed on a substrate layer D2.

In a preferred embodiment of the process according to the invention in a first step a layer composite A-B' is provided, wherein A is a substrate layer and B' is a photopolymer layer containing a volume hologram, in a second step the uncured protective layer C1 is applied atop a substrate layer D1 to afford a layer composite C1-D1, in a third step the layer composite A-B' is areally joined to the layer composite C1-D1 to afford a layer composite A-B'-C1-D1, wherein the layer composite A-B' is preferably joined to the layer composite C1-D1 by lamination, in a fourth step the substrate layer D1 is removed from the layer composite A-B'-C1-D1 to afford a layer composite A-B'-C1, in a fifth step the uncured protective layer C2 is applied atop a substrate layer D2 to afford a layer composite C2-D2, in a sixth step the layer composite A-B'-C1 is areally joined to the layer composite C2-D2 to afford a layer composite A-B'-C1-C2-D2, wherein the layer composite A-B'-C1 is preferably joined to the layer composite C2-D2 by lamination, in a seventh step the layer composite A-B'-C1-C2-D2 is cured with actinic radiation to afford a layer composite A-B'-C1'-C2'-D2.

In a preferred embodiment of the process according to the invention in an eighth step the substrate layer D2 is removed from the layer composite A-B'-C1'-C2'-D2 to afford a layer composite A-B'-C1'-C2'.

In a preferred embodiment of the process according to the invention an at least partial curing of the protective layers C1 and C2 of the layer composite A-B'-C1-C2-D2 with actinic radiation is effected over 60 minutes, preferably over 5 minutes, particularly preferably over less than 60 seconds.

In a further embodiment of the process according to the invention this comprises the steps of:
  producing a light-sensitive holographic film having the layer construction A-B', comprising
    preparing a coating composition for producing the photopolymer layer B;
    coating the substrate A with this coating composition to form the layer composite A-B;
    inscribing a hologram into the photopolymer layer B to form the layer composite A-B*, wherein B* is an irradiated photopolymer layer comprising an inscribed hologram;
    fixing the hologram in the photopolymer layer B* by areal broadband UV/VIS irradiation of the entire layer construction A-B* with a light energy dose of 5-10 J/cm$^2$ to form the layer composite A-B', wherein B' is the bleached, through-polymerized and no-longer-photosensitive photopolymer layer B comprising a fixed hologram;
  producing a layer composite C1-D1 comprising an uncured protective layer C1, comprising:
    preparing a coating composition for producing the layer C1;
    coating the substrate D1 with this coating composition;
  producing a holographic film having the layer construction A-B'-C1-D1, comprising applying the layer composite C1-D1 atop the layer composite A-B' followed by areal joining of the two layer composites to one another, preferably by lamination, to form a layer composite A-B'-C1-D1;
  removing the substrate layer D1 to form the layer composite A-B'-C1;
  producing a layer composite C2-D2 comprising an uncured protective layer C2, comprising:
    preparing a coating composition for producing the layer C2;
    coating the substrate D2 with this coating composition;
  producing a holographic film having the layer construction A-B'-C1-C2-D2, comprising applying the layer composite C2-D2 atop the layer composite A-B'-C1 followed by areal joining of the two layer composites to one another, preferably by lamination, to form a layer composite A-B'-C1-C2-D2;
  subjecting the layer composite A-B'-C1-C2-D2 to actinic radiation, preferably to UV/VIS radiation with a light energy dose of 5-10 J/cm$^2$, to form the layer composite A-B'-C1'-C2'-D2, wherein C1' and C2' are the cured protective layers C1 and C2;
  removing the substrate layer D1 to form the film composite A-B'-C1'-C2'.

In a preferred embodiment of the process according to the invention the reactive diluent C1-II in the protective layer C1 and the reactive diluent C2-II in the protective layer C2 is a urethane acrylate obtainable from the reaction of tris(p-isocyanatophenyl)thiophosphate with alcohol-functional acrylates such as hydroxyethyl (meth)acrylate, hydroxypropyl (meth)acrylate and/or hydroxybutyl (meth)acrylate, preferably phosphorothioyltris(oxybenzene-4,1-diylcarbamoyloxyethane-2,1-diyl) trisacrylate.

In a particularly preferred embodiment of the process according to the invention the reactive diluent C1-II in the protective layer C1 and the reactive diluent C2-II in the protective layer C2 is preconditioned and prepurified phosphorothioyltris(oxybenzene-4,1-diylcarbamoyloxyethane-2,1-diyl) trisacrylate. For preconditioning and purification a 10% by weight solution of phosphorothioyltris(oxybenzene-4,1-diylcarbamoyloxyethane-2,1-diyl) trisacrylate in ethyl acetate and cyclohexane is produced, said solution is filtered through a layer of Kieselgel 60 (Merck), followed by distillative removal of the cyclohexane and excess ethyl acetate until a 40% solution in ethyl acetate is obtained. The purification step is repeated until the 40% solution in ethyl acetate has a HAZEN colour number (DIN ISO 6271-2: 2002) below 100.

The invention likewise provides a sealed holographic medium comprising a layer construction A-B'-C1'-C2', a sealed holographic medium comprising a layer construction B'-C1'-C2', a sealed holographic medium comprising a layer construction B'-C1'-C2'-D2 and a sealed holographic medium comprising a layer construction A-B'-C1'-C2'-D2 obtainable from the above-described process according to the invention.

The invention likewise provides a kit of parts containing at least one uncured protective layer C1, at least one uncured protective layer C2 and an areal photopolymer layer B' containing a volume hologram, wherein the protective layers C1 and C2 are different.

The uncured protective layers C1 and C2 are the inventive uncured protective layers C1 and C2 as defined in the description.

In a preferred embodiment of the kit of parts according to the invention the photopolymer layer B' is disposed on a substrate layer A, wherein the photopolymer layer B' is on one side at least partly joined to the substrate layer A.

In a preferred embodiment of the kit of parts according to the invention the uncured protective layer C1 is disposed on a substrate layer D1, wherein the protective layer C1 is on one side at least partly joined to the substrate layer D1, and the uncured protective layer C2 is disposed on a substrate layer D2, wherein the protective layer C2 is on one side at least partly joined to the substrate layer D2.

In a preferred embodiment the substrate layer D1 is a polyester substrate, preferably a PET substrate, yet more preferably a silicone-modified PET substrate, having a film thickness of <200 µm, more preferably <100 µm and >20 µm, yet more preferably <45 µm and >20 µm.

In a preferred embodiment the substrate layer D2 is a polyester substrate, preferably a PET substrate, yet more preferably a trilayer coextrudate PET substrate, having a film thickness of <200 µm, more preferably <100 µm and >20 µm, yet more preferably <45 µm and >20 µm.

In a preferred embodiment the substrate layer D1 is a polyester substrate, preferably a PET substrate, yet more preferably a silicone-modified PET substrate, having a film thickness of <200 µm, more preferably <100 µm and >20 µm, yet more preferably <45 µm and >20 µm, and the substrate layer D2 is a polyester substrate, preferably a PET substrate, yet more preferably a trilayer coextrudate PET substrate, having a film thickness of <200 µm, more preferably <100 µm and >20 µm, yet more preferably <45 µm and >20 µm.

In a preferred embodiment of the kit of parts according to the invention the uncured protective layer C1 comprises
I) at least one thermoplastic mainly linear and semicrystalline polyurethane resin C1-I,
II) at least one multifunctional acrylate reactive diluent C1-II,
III) at least one photoinitiator C1-III and
IV) optionally assistant and added substances and
the uncured protective layer C2 comprises
I) at least one thermoplastic resin C2-I selected from the group consisting of polyvinyl butyral and polymethyl methacrylate,
II) at least one multifunctional acrylate reactive diluent C2-II,
III) at least one photoinitiator C2-III and
IV) optionally assistant and added substances.

In a preferred embodiment of the kit of parts according to the invention the uncured protective layer C1 comprises
I) at least one thermoplastic mainly linear and semicrystalline polyurethane resin C1-I,
II) at least one multifunctional acrylate reactive diluent C1-II selected from the group consisting of phosphorothioyltris(oxybenzene-4,1-diylcarbamoyloxyethane-2,1-diyl) trisacrylate, dipentaerythritol pentaacrylate and dipentaerythritol hexaacrylate,
III) at least one photoinitiator C1-III and
IV) optionally assistant and added substances and
the uncured protective layer C2 comprises
I) at least one thermoplastic resin C2-I selected from the group consisting of polyvinyl butyral and polymethyl methacrylate,
II) at least one multifunctional acrylate reactive diluent C2-II selected from the group consisting of phosphorothioyltris(oxybenzene-4,1-diylcarbamoyloxyethane-2,1-diyl) trisacrylate, pentaerythritol triacrylate and quadruply ethoxylated pentaerythritol tetraacrylate,
III) at least one photoinitiator C2-III and
IV) optionally assistant and added substances.

Substrate Layer A

The substrate layer A is preferably a thermoplastic substrate layer/substrate film or another carrier, for example glass, plastic, metal or wood. Materials or material composites of the thermopolastic substrate layer A are based on polycarbonate (PC), polyethylene terephthalate (PET), amorphous polyesters, polybutylene terephthalate, polyethylene, polypropylene, cellulose acetate, cellulose hydrate, cellulose nitrate, cycloolefin polymers, polystyrene, hydrogenated polystyrene, polyepoxides, polysulfone, thermoplastic polyurethane (TPU), cellulose triacetate (CTA), polyamide (PA), polymethyl methacrylate (PMMA), polyvinyl chloride, polyvinyl acetate, polyvinylbutyral or polydicyclopentadiene or mixtures thereof. They are particularly preferably based on PC, PET, PA, PMMA and CTA. Material composites may be film laminates or coextrudates. Preferred material composites are duplex and triplex films constructed according to one of the schemes A/B, A/B/A or A/B/C. Particularly preferred are PC/PMMA, PC/PA, PC/PET, PET/PC/PET and PC/TPU. It is preferable when substrate layer A is transparent in the spectral region of 400-800 nm.

Photopolymer Layer B

The photopolymer layer B' is generated by inscribing a hologram into the unirradiated photopolymer layer B followed by optical fixing of the hologram preferably by aerial broadband UV/VIS irradiation of the photopolymer layer comprising the inscribed hologram with a light energy dose of 5-10 J/cm. During the fixing, residues of writing monomers that were not involved in the local formation of the hologram are through-polymerized in the entire photopolymer layer. The dyes used as sensitizers are likewise photochemically destroyed. The strong technological discoloration of the photopolymer layer B caused by dyes disappears entirely. The photopolymer layer B is bleached by the fixing and is converted into a no-longer-photoactive, dye-free stable photopolymer layer B' comprising an inscribed hologram.

The photopolymer layer B' preferably comprises crosslinked matrix polymers, in particular three-dimensionally crosslinked matrix polymers, wherein the matrix polymers are preferably polyurethanes.

The photopolymer layer B comprises matrix polymers, writing monomers and photoinitiators. Employable matrix polymers are amorphous thermoplastics, for example polyacrylates, polymethyl methacrylates or copolymers of methyl methacrylate, methacrylic acid or other alkyl acrylates and alkyl methacrylates, and also acrylic acid, for example polybutyl acrylate, and also polyvinyl acetate and polyvinyl butyrate, the partially hydrolysed derivatives thereof, such as polyvinyl alcohols, and copolymers with ethylene and/or further (meth)acrylates, gelatins, cellulose esters and cellulose ethers such as methyl cellulose, cellulose acetobutyrate, silicones, for example polydime-thylsilicone, polyurethanes, polybutadienes and polyisoprenes, and also polyethylene oxides, epoxy resins, in particular aliphatic epoxy resins, polyamides, polycarbonates and the systems cited in U.S. Pat. No. 4,994,347A and therein.

Epoxy resins may be cationically intracrosslinked. In addition, it is also possible to use acids/anhydrides, amines, hydroxyalkyl amides and thiols as crosslinkers. Silicones can be crosslinked either as one-component systems through condensation in the presence of water (and optionally under Brønsted acid catalysis) or as two-component systems by addition of silicic esters or organotin compounds. Likewise possible is the hydrosilylations in vinyl-silane systems.

Unsaturated compounds, for example acryloyl-functional polymers or unsaturated esters, can be crosslinked with amines or thiols. Cationic vinyl ether polymerization is also possible.

However, it is especially preferable when the matrix polymers are crosslinked matrix polymers, preferably three-dimensionally crosslinked matrix polymers and very particularly preferably three-dimensionally crosslinked polyurethanes.

Polyurethane matrix polymers are obtainable in particular by reaction of at least one polyisocyanate component a) with at least one isocyanate-reactive component b).

The polyisocyanate component a) comprises at least one organic compound having at least two NCO groups. These organic compounds may in particular be monomeric di- and triisocyanates, polyisocyanates and/or NCO-functional prepolymers. The polyisocyanate component a) may also contain or consist of mixtures of monomeric di- and triisocyanates, polyisocyanates and/or NCO-functional prepolymers.

Employable monomeric di- and triisocyanates include all of the compounds or mixtures thereof well known per se to the person skilled in the art. These compounds may have aromatic, araliphatic, aliphatic or cycloaliphatic structures. In minor amounts the monomeric di- and triisocyanates may also comprise monoisocyanates, i.e. organic compounds having one NCO group.

Examples of suitable monomeric di- and triisocyanates are butane 1,4-diisocyanate, pentane 1,5-diisocyanate, hexane 1,6-diisocyanate (hexamethylene diisocyanate, HDI), 2,2,4-trimethylhexamethylene diisocyanate and/or 2,4,4-trimethylhexamethylene diisocyanate (TMDI), isophorone diisocyanate (IPDI), 1,8-diisocyanato-4-(isocyanatomethyl)octane, bis(4,4'-isocyanatocyclohexyl)methane and/or bis(2',4-isocyanatocyclohexyl)methane and/or mixtures thereof with any isomer content, cyclohexane 1,4-diisocyanate, the isomeric bis(isocyanatomethyl)cyclohexanes, 2,4- and/or 2,6-diisocyanato-1-methylcyclohexan, (hexahydrotolylene 2,4- and/or 2,6-diisocyanate, H6-TDI), phenylene 1,4-diisocyanate, tolylene 2,4- and/or 2,6-diisocyanate (TDI), naphthylene 1,5-diisocyanate (NDI), diphenylmethane 2,4'- and/or 4,4'-diisocyanate (MDI), 1,3-bis(isocyanatomethyl)benzene (XDI) and/or the analogous 1,4 isomer, or any desired mixtures of the aforementioned compounds.

Suitable polyisocyanates are compounds which have urethane, urea, carbodiimide, acylurea, amide, isocyanurate, allophanate, biuret, oxadiazinetrione, uretdione and/or iminooxadiazinedione structures and are obtainable from the aforementioned di- or triisocyanates.

It is particularly preferable when the polyisocyanates are oligomerized aliphatic and/or cycloaliphatic di- or triisocyanates, the abovementioned aliphatic and/or cycloaliphatic di- or triisocyanates in particular being employable.

Very particular preference is given to polyisocyanates having isocyanurate, uretdione and/or iminooxadiazinedione structures and also to biurets based on HDI or mixtures thereof.

Suitable prepolymers contain urethane and/or urea groups, and optionally further structures formed through modification of NCO groups as recited above. Such prepolymers are obtainable for exam-pie by reaction of the abovementioned monomeric di- and triisocyanates and/or polyisocyanates a1) with isocyanate-reactive compounds b1).

Employable isocyanate-reactive compounds b1) include alcohols or amino or mercapto compounds, preferably alcohols. These may in particular be polyols. Very particularly preferably employable as isocyanate-reactive compound b1) are polyester polyols, polyether polyols, polycarbonate polyols, poly(meth)acrylate polyols and/or polyurethane polyols.

Suitable polyester polyols are, for example, linear polyester diols or branched polyester polyols which can be obtained in a known manner by reacting aliphatic, cycloaliphatic or aromatic di- or polycarboxylic acids or the anhydrides thereof with polyhydric alcohols of OH functionality $\geq 2$. Examples of suitable di- or polycarboxylic acids are polybasic carboxylic acids such as succinic acid, adipic acid, suberic acid, sebacic acid, decanedicarboxylic acid, phthalic acid, terephthalic acid, isophthalic acid, tetrahydrophthalic acid or trimellitic acid, and acid anhydrides such as phthalic anhydride, trimellitic anhydride or succinic anhydride, or any desired mixtures thereof. The polyester polyols may also be based on natural raw materials such as castor oil. It is likewise possible that the polyester polyols are based on homo- or copolymers of lactones which are preferably obtainable by addition of lactones or lactone mixtures such as butyrolactone, ε-caprolactone and/or methyl-ε-caprolactone onto hydroxy-functional compounds such as polyhydric alcohols of OH functionality $\geq 2$, for example of the kind recited below.

Examples of suitable alcohols are all polyhydric alcohols, for example the $C_2$-$C_{12}$ diols, the isomeric cyclohexanediols, glycerol or any desired mixtures thereof with one another.

Suitable polycarbonate polyols are obtainable in a manner known per se by reacting organic carbonates or phosgene with diols or diol mixtures.

Suitable organic carbonates are dimethyl carbonate, diethyl carbonate and diphenyl carbonate.

Suitable diols or mixtures comprise the polyhydric alcohols of OH functionality $\geq 2$ mentioned per se in the context of the polyester segments, preferably butane-1,4-diol, hexane-1,6-diol and/or 3-methylpentanediol. It is also possible to convert polyester polyols to polycarbonate polyols.

Suitable polyether polyols are polyaddition products, optionally of blockwise construction, of cyclic ethers onto OH- or NH-functional starter molecules.

Suitable cyclic ethers are, for example, styrene oxides, ethylene oxide, propylene oxide, tetrahydrofuran, butylene oxide, epichlorohydrin and any desired mixtures thereof.

Employable starters include the polyhydric alcohols having an OH functionality $\geq 2$ recited in the context of the polyester polyols and also primary or secondary amines and amino alcohols.

Preferred polyether polyols are those of the aforementioned type based exclusively on propylene oxide, or random or block copolymers based on propylene oxide with further 1-alkylene oxides. Particular preference is given to propylene oxide homopolymers and random or block copolymers having oxyethylene, oxypropylene and/or oxybutylene units, where the proportion of the oxypropylene units based on the total amount of all oxyethylene, oxypropylene and oxybutylene units makes up at least 20% by weight, preferably at least 45% by weight. Oxypropylene and oxybutylene here include all respective linear and branched $C_3$ and $C_4$ isomers.

Also suitable as constituents of the polyol component b1) as polyfunctional, isocyanate-reactive compounds, are low molecular weight, i.e. having molecular weights $\leq 500$ g/mol, short-chain, i.e. containing 2 to 20 carbon atoms, aliphatic, araliphatic or cycloaliphatic di-, tri- or polyfunctional alcohols.

These may be, for example, in addition to the abovementioned compounds, neopentyl glycol, 2-ethyl-2-butylpropanediol, trimethylpentanediol, positionally isomeric diethyloctanediols, cyclohex-anediol, cyclohexane-1,4-dimethanol, hexane-1,6-diol, cyclohexane-1,2- and -1,4-diol, hydrogenated bisphenol A, 2,2-bis(4-hydroxycyclohexyl)propane or 2,2-dimethyl-3-hydroxypropionic acid, 2,2-dimethyl-3-hydroxypropyl esters. Examples of suitable triols are trimethylolethane, trimethylolpropane or glycerol. Suitable higher-functionality alcohols are di(trimethylolpropane), pentaerythritol, dipentaerythritol or sorbitol.

It is particularly preferred when the polyol component is a difunctional polyether or polyester or a polyether-polyester block copolyester or a polyether-polyester block copolymer with primary OH functions.

It is likewise possible to use amines as isocyanate-reactive compounds b1). Examples of suitable amines are ethylenediamine, propylenediamine, diaminocyclohexane, 4,4'-dicyclohexylmethanediamine, isophoronediamine (IPDA), difunctional polyamines, for example the Jeffamines®, amine-terminated polymers, in particular having number-average molar masses ≤10 000 g/mol. Mixtures of the aforementioned amines may likewise be used.

It is likewise possible to use amino alcohols as isocyanate-reactive compounds b1). Examples of suitable amino alcohols are the isomeric aminoethanols, the isomeric aminopropanols, the isomeric aminobutanols and the isomeric aminohexanols or any desired mixtures thereof.

All the aforementioned isocyanate-reactive compounds b1) can be mixed with one another as desired.

It is also preferable when the isocyanate-reactive compounds b1) have a number-average molar mass of ≥200 and ≤10 000 g/mol, more preferably ≥500 and ≤8000 g/mol and very particularly preferably ≥800 and ≤5000 g/mol. The OH functionality of the polyols is preferably 1.5 to 6.0, particularly preferably 1.8 to 4.0.

The prepolymers of the polyisocyanate component a) may in particular have a residual content of free monomeric di- and triisocyanates of <1% by weight, particularly preferably <0.5% by weight and very particularly preferably <0.3% by weight.

It may also be possible for the polyisocyanate component a) to contain, in full or in part, an organic compound wherein the NCO groups have been fully or partly reacted with blocking agents known from coating technology. Examples of blocking agents are alcohols, lactams, oximes, malonic esters, pyrazoles, and amines, for example butanone oxime, diisopropylamine, diethyl malonate, ethyl acetoacetate, 3,5-dimethylpyrazole, ε-caprolactam, or mixtures thereof.

It is particularly preferable when the polyisocyanate component a) comprises compounds having aliphatically bonded NCO groups, where aliphatically bonded NCO groups are understood to mean those groups bonded to a primary carbon atom. The isocyanate-reactive component b) preferably comprises at least one organic compound having on average least 1.5 and preferably 2 to 3 isocyanate-reactive groups. In the context of the present invention, isocyanate-reactive groups are preferably considered to be hydroxyl, amino or mercapto groups.

The isocyanate-reactive component may particular comprise compounds having a number average of at least 1.5 and preferably 2 to 3 isocyanate-reactive groups.

Suitable polyfunctional isocyanate-reactive compounds of component b) are, for example, the above-described compounds b1).

Photoinitiators suitable according to the invention are typically compounds which are activatable by actinic radiation and can initiate polymerization of the writing monomers. Among the photoinitiators a distinction may be made between unimolecular (type I) and bimolecular (type II) initiators. In addition, they are distinguished by their chemical nature as photoinitiators for free-radical, anionic, cationic or mixed types of polymerization.

Type I photoinitiators (Norrish type I) for free-radical photopolymerization on irradiation form free radicals through unimolecular bond scission. Examples of type I photoinitiators are triazines, oximes, benzoin ethers, benzil ketals, bisimidazoles, aroylphosphine oxides, sulfonium salts and iodonium salts.

Type II photoinitiators (Norrish type II) for free-radical polymerization consist of a dye sensitizer and a coinitiator, and undergo a bimolecular reaction on irradiation with light attuned to the dye. The dye at first absorbs a photon and transmits energy to the coinitiator from an excited state. The latter releases the polymerization-initiating free radicals through electron or proton transfer or direct hydrogen abstraction.

In the context of the present invention, preference is given to using type II photoinitiators.

The dye and the coinitiator of the type II photoinitiators may either be directly mixed conjointly with the further components of the photopolymer or alternatively be singly premixed with individual components. Especially when the photopolymer is to contain polyurethane matrix polymers, the dye may be premixed with the isocyanate-reactive component and the coinitiator with the isocyanate component. However, it is likewise also possible to premix the coinitiator with the isocyanate-reactive component and the dye with the isocyanate component.

Such photoinitiator systems are described in principle in EP 0 223 587 A and preferably consist of a mixture of one or more dyes with ammonium alkylarylborate(s).

Suitable dyes which, together with an ammonium alkylarylborate, form a type II photoinitiator are the cationic dyes described in WO 2012062655 in combination with the anions likewise described therein.

Suitable ammonium alkylarylborates are for example (Cunningham et al., RadTech'98 North America UV/EB Conference Proceedings, Chicago, Apr. 19-22, 1998): tetrabutylammonium tri-phenylhexylborate, tetrabutylammonium triphenylbutylborate, tetrabutylammonium trinaphthylhexylborate, tetrabutylammonium tris(4-tert-butyl)phenylbutylborate, tetrabutylammonium tris(3-fluorophenyl)hexylborate hexylborate ([191726-69-9], CGI 7460, product from BASF SE, Basle, Switzerland), 1-methyl-3-octylimidazolium dipentyldiphenylborate and tetrabutylammonium tris(3-chloro-4-methylphenyl)hexylborate ([1147315-11-4], CGI 909, product from BASF SE, Basle, Switzerland).

It may be advantageous to use mixtures of these photoinitiators. According to the radiation source used, the type and concentration of photoinitiator has to be adjusted in the manner known to those skilled in the art. Further details are described, for example, in P. K. T. Oldring (Ed.), Chemistry & Technology of UV & EB Formulations For Coatings, Inks & Paints, Vol. 3, 1991, SITA Technology, London, p. 61-328.

It is very particularly preferable when the photoinitiator comprises a combination of dyes whose absorption spectra at least partly cover the spectral range from 400 to 800 nm with at least one coinitiator attuned to the dyes.

It is also preferable when at least one photoinitiator suitable for a laser light colour selected from blue, green and red is present in the photopolymer formulation.

It is also more preferable when the photopolymer formulation contains a suitable photoinitiator for each of at least two laser light colours selected from blue, green and red.

Finally, it is very particularly preferable when the photopolymer formulation contains a suitable photoinitiator for each of the laser light colours blue, green and red.

A further preferred embodiment provides that the writing monomers comprise a mono- and/or a multifunctional (meth)acrylate writing monomer. The writing monomers may very particularly preferably further comprise at least one mono- and/or one multifunctional urethane (meth)acrylate.

Suitable acrylate writing monomers are in particular compounds of general formula (I)

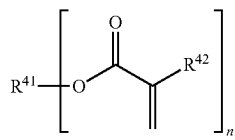

where n≥1 and n≤4 and $R^{41}$ is a linear, branched, cyclic or heterocyclic unsubstituted or else optionally heteroatom-substituted organic radical and/or $R^{42}$ is hydrogen, a linear, branched, cyclic or heterocyclic unsubstituted or else optionally heteroatom-substituted organic radical. It is particularly preferable when $R^{42}$ is hydrogen or methyl and/or $R^{41}$ is a linear, branched, cyclic or heterocyclic unsubstituted or else optionally heteroatom-substituted organic radical.

Acrylates and methacrylates refer in the present context, respectively, to esters of acrylic acid and methacrylic acid. Examples of acrylates and methacrylates usable with preference are phenyl acrylate, phenyl methacrylate, phenoxyethyl acrylate, phenoxyethyl methacrylate, phenoxyethoxyethyl acrylate, phenoxyethoxyethyl methacrylate, phenylthioethyl acrylate, phenylthioethyl methacrylate, 2-naphthyl acrylate, 2-naphthyl methacrylate, 1,4-bis(2-thionaphthyl)-2-butyl acrylate, 1,4-bis(2-thionaphthyl)-2-butyl methacrylate, bisphenol A diacrylate, bisphenol A dimethacrylate, and the ethoxylated analogue compounds thereof, N-carbazolyl acrylates.

Urethane acrylates are understood in the present context to mean compounds having at least one acrylic ester group and at least one urethane bond. Such compounds can be obtained, for example, by reacting a hydroxy-functional acrylate or methacrylate with an isocyanate-functional compound.

Examples of isocyanate-functional compounds usable for this purpose are monoisocyanates, and the monomeric diisocyanates, triisocyanates and/or polyisocyanates mentioned under a). Examples of suitable monoisocyanates are phenyl isocyanate, the isomeric methylthiophenyl isocyanates. Di-, tri- or polyisocyanates are mentioned above as are triphenylmethane 4,4',4"-triisocyanate and tris(p-isocyanatophenyl) thiophosphate or derivatives thereof having a urethane, urea, carbodiimide, acylurea, isocyanurate, allophanate, biuret, oxadiazinetrione, uretdione or iminooxadiazinedione structure and mixtures thereof. Preference is given here to aromatic di-, tri- or polyisocyanates.

Contemplated hydroxy-functional acrylates or methacrylates for the production of urethane acrylates include, for example, compounds such as 2-hydroxyethyl (meth)acrylate, polyethylene oxide mono(meth)acrylates, polypropylene oxide mono(meth)acrylates, polyalkylene oxide mono(meth)acrylates, poly(ε-caprolactone) mono(meth)acrylates, for example Tone® M100 (Dow, Schwalbach, Del.), 2-hydroxypropyl (meth)acrylate, 4-hydroxybutyl (meth)acrylate, 3-hydroxy-2,2-dimethylpropyl (meth)acrylate, hydroxypropyl (meth)acrylate, 2-hydroxy-3-phenoxypropyl acrylate, the hydroxy-functional mono-, di- or tetraacrylates of polyhydric alcohols such as trimethylolpropane, glycerol, pentaerythritol, dipentaerythritol, ethoxylated, propoxylated or alkoxylated trimethylolpropane, glycerol, pentaerythritol, dipentaerythritol or the technical grade mixtures thereof. Preference is given to 2-hydroxyethyl acrylate, hydroxypropyl acrylate, 4-hydroxybutyl acrylate and poly(ε-caprolactone) mono(meth)acrylate.

It is likewise possible to use the known-per-se hydroxyl-containing epoxy (meth)acrylates having OH contents of 20 to 300 mg KOH/g or hydroxyl-containing polyurethane (meth)acrylates having OH contents of 20 to 300 mg KOH/g or acrylated polyacrylates having OH contents of 20 to 300 mg KOH/g and mixtures of these with one another, and mixtures with hydroxyl-containing unsaturated polyesters and mixtures with polyester (meth)acrylates or mixtures of hydroxyl-containing unsaturated polyesters with polyester (meth)acrylates.

Preference is given in particular to urethane acrylates obtainable from the reaction of tris(p-isocyanatophenyl) thiophosphate and/or m-methylthiophenyl isocyanate with alcohol-functional acrylates such as hydroxyethyl (meth)acrylate, hydroxypropyl (meth)acrylate and/or hydroxybutyl (meth)acrylate.

It is likewise possible that the writing monomer comprises further unsaturated compounds such as α,β-unsaturated carboxylic acid derivatives, for example maleates, fumarates, maleimides, acrylamides, and also vinyl ethers, propenyl ethers, allyl ethers and compounds containing dicyclopentadienyl units, and also olefinically unsaturated compounds, for example styrene, α-methylstyrene, vinyltoluene and/or olefins.

In a further preferred embodiment, it is provided that the photopolymer formulation additionally contains monomeric urethanes as additives, in which case the urethanes may especially be substituted by at least one fluorine atom.

The urethanes may preferably have the general formula (II)

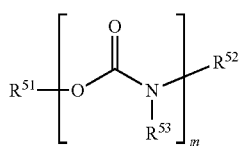

in which m≥1 and m≤8 and $R^{51}$, $R^{52}$ and $R^{53}$ are linear, branched, cyclic or heterocyclic unsubstituted or else optionally heteroatom-substituted organic radicals and/or $R^{52}$, $R^{53}$ are independently of one another hydrogen, wherein preferably at least one of the radicals $R^{51}$, $R^{52}$, $R^{53}$ is substituted by at least one fluorine atom and particularly preferably $R^{51}$ is an organic radical having at least one fluorine atom. It is particularly preferable when $R^{52}$ is a linear, branched, cyclic or heterocyclic organic radical which is unsubstituted or else optionally substituted with heteroatoms, for example fluorine.

In a further preferred embodiment of the invention, it is provided that the photopolymer contains 10% to 89.999% by weight, preferably 20% to 70% by weight, of matrix polymers, 3% to 60% by weight, preferably 10% to 50% by weight, of writing monomers, 0.001% to 5% by weight, preferably 0.5% to 3% by weight, of photoinitiators and optionally 0% to 4% by weight, preferably 0% to 2% by weight, of catalysts, 0% to 5% by weight, preferably 0.001% to 1% by weight, of stabilizers, 0% to 40% by weight, preferably 10% to 30% by weight, of monomeric fluorourethanes and 0% to 5% by weight, preferably 0.1% to 5% by weight, of further additives, wherein the sum of all constituents is 100% by weight.

Particular preference is given to using photopolymers comprising 20% to 70% by weight of matrix polymers, 20% to 50% by weight of writing monomers, 0.001% to 5% by weight of photoinitiators, 0% to 2% by weight of catalysts, 0.001% to 1% by weight of free-radical stabilizers, optionally 10% to 30% by weight of fluorourethanes and optionally 0.1% to 5% by weight of further additives.

Employable catalysts include urethanization catalysts, for example organic or inorganic derivatives of bismuth, of tin, of zinc or of iron (see also the compounds specified in US 2012/062658). Particularly preferred catalysts are butyltin tris(2-ethylhexanoate), iron(III) trisacetylacetonate, bismuth(III) tris(2-ethylhexanoate) and tin(II) bis(2-ethylhexanoate). In addition, it is also possible to use sterically hindered amines as catalysts.

Employable stabilizers include free-radical inhibitors such as HALS amines, N-alkyl HALS, N-alkoxy HALS and N-alkoxyethyl HALS compounds, and also antioxidants and/or UV absorbers.

Employable further additives include flow control agents and/or antistats and/or thixotropic agents and/or thickeners and/or biocides.

Protective Layer C1

Before curing with actinic radiation the protective layer C1 comprises at least one physically drying polymeric resin C1-I, at least one multifunctional acrylate reactive diluent (RD) C1-II and at least one photoinitiator C1-III. It is preferable when the protective layer C1 additionally comprises a UV absorber in an amount of 0.1% to 10% by weight.

The physically drying resins for the protective layer C1 are thermoplastic mainly linear semicrystalline polyurethanes (see for example Günter Oertel (editor): *Kunststoff-Handbuch—Vol. 7 Polyurethanes*. 3rd Edition. Carl Hanser Verlag, 1993). Preference is given to the Desmocoll® and Desmomelt® polyurethanes from Covestro Deutschland AG which have been specially developed as thermoactivating adhesives. Further examples for suitable thermoplastic mainly linear semicrystalline polyurethanes for the protective layer C1 are described in DE 3729068 A1, DE 3702394 A1 und US 20050112971 A1, the disclosure of which in this regard is hereby incorporated herein by reference.

The acryloyl-functional reactive diluent is from the class of multifunctional (preferably at least trifunctional) acrylates. Preference is given here to either a triacrylate selected from Desmodur® RFE from Covestro AG and hydroxyethyl acrylate and/or dipentaerythritol pentaacrylate and/or dipentaerythritol hexaacrylate. It is particularly preferable when the acryloyl-functional reactive diluents as a 40% solution in ethyl acrylate have a colour number of <200 Hazen, particularly preferably of <100 Hazen (DIN ISO 6271-2:2002). Particular preference is given to preconditioned and prepurified phosphorothioyltris(oxybenzene-4,1-diylcarbamoyloxyethan-2,1-diyl) trisacrylate. The phosphorothioyltris (oxybenzene-4,1-diylcarbamoyloxyethane-2,1-diyl) trisacrylate may be purified and preconditioned as described below.

The employed photoinitiators are typically compounds which are activatable by actinic radiation and can initiate polymerization of the corresponding groups.

Among the photoinitiators a distinction may be made between unimolecular (type I) and bimolecular (type II) initiators for initiating free-radical polymerization; there is extensive prior art concerning this.

Type I photoinitiators (Norrish type I) for free-radical photopolymerization on irradiation form free radicals through unimolecular bond scission.

Examples of type I photoinitiators are triazines, for example tris(trichloromethyl)triazine, oximes, benzoin ethers, benzil ketals, alpha-alpha-dialkoxyacetophenone, phenylglyoxylic esters, bisimidazoles, aroyl phosphinoxides, for example 2,4,6-trimethylbenzoyldiphenylphosphinoxide, sulfonium and iodonium salts.

Type II photoinitiators (Norrish type II) for free-radical polymerization on irradiation undergo a bimolecular reaction, wherein the photoinitiator in the excited state reacts with a second molecule, the coinitiator, and by electron or proton transfer or direct hydrogen abstraction forms the polymerization-initiating free radicals.

Examples of type II photoinitiators are quinones, for example camphorquinone, aromatic keto compounds, for example benzophenone in combination with tertiary amines, alkyl benzophenones, halogenated benzophenones, 4,4'-bis (dimethylamino)benzophenone (Michler's ketone), anthrone, methyl-p-(dimethylamino) benzoate, thioxanthone, ketocoumarins, alpha-aminoalkylphenone, alpha-hydroxyalkylphenone and cationic dyes, for example methylene blue, in combination with tertiary amines.

For the UV and shortwave visible range type I and type II photoinitiators are employed and for the longer wave visible light range predominantly type II photoinitiators are employed.

Preference is given to 1-hydroxycyclohexyl phenyl ketone (e.g. Irgacure® 184 from BASF SE), 2-hydroxy-2-methyl-1-phenyl-1-propanone (e.g. Irgacure® 1173 from BASF SE), 2-hydroxy-1-{4-[4-(2-hydroxy-2-methylpropionyl)benzyl]phenyl}-2-methylpropan-1-one (e.g. Irgacure® 127 from BASF SE), 2-hydroxy-1-[4-(2-hydroxyethoxy) phenyl]-2-methyl-1-propanone (e.g. Irgacure® 2959 from BASF SE); 2,4,6-trimethylbenzoyldiphenylphosphine oxide (e.g. Lucirin® TPO from BASF SE); 2,4,6-trimethylbenzoyldiphenyl phosphinate (e.g. Lucirin® TPO-L from BASF SE), bis(2,4,6-trimethylbenzoyl)phenylphosphine oxide (Lucirin® 819); [1-(4-phenylsulfanylbenzoyl)heptylideneamino] benzoate (e.g. Irgacure® OXE 01 from BASF SE); [1-[9-ethyl-6-(2-methylbenzoyl)carbazol-3-yl]ethylideneamino] acetate (e.g. Irgacure® OXE 02 from BASF SE) and mixtures thereof. Particular preference is given to 2-hydroxy-2-methyl-1-phenyl-1-propanone and 2,4,6-trimethylbenzoyldiphenylphosphine oxides and mixtures thereof.

Typical UV absorbers are benzotriazoles, cyanoacrylates, benzophenones, phenyltriazines, hydroxyphenyltrazines or oxalanilides.

Furthermore, light stabilizers such as phenols or HALS amines may also be present.

In a preferred embodiment the uncured protective layer C1 comprises
- I) at least one thermoplastic mainly linear and semicrystalline polyurethane resin C1-I,
- II) at least one multifunctional acrylate reactive diluent C1-II selected from the group consisting of phosphorothioyltris(oxybenzene-4,1-diylcarbamoyloxyethane-2,1-diyl) trisacrylate, dipentaerythritol pentaacrylate and dipentaerythritol hexaacrylate,
- III) at least one photoinitiator C1-III and
- IV) optionally assistant and added substances.

Substrate Layer D1

The substrate layer D1 is preferably a thermoplastic substrate layer/substrate film. Materials or material composites of the thermopolastic substrate layer/substrate film D1 are based on polycarbonate (PC), polyethylene terephthalate (PET), amorphous polyesters, polybutylene terephthalate, polyethylene, polypropylene, cellulose acetate, cellulose hydrate, cellulose nitrate, cycloolefin polymers, polystyrene, hydrogenated polystyrene, polyepoxides, polysulfone, thermoplastic polyurethane (TPU), cellulose triacetate (CTA), polyamide (PA), polymethyl methacrylate (PMMA), polyvinyl chloride, polyvinyl acetate, polyvinylbutyral or polydicyclopentadiene or mixtures thereof. They are particularly preferably based on PC, PET, PA, PMMA and CTA. Material composites may be film laminates or coextrudates. Preferred material composites are duplex and triplex films constructed according to one of the schemes A/B, A/B/A or A/B/C. Particularly preferred are PC/PMMA, PC/PA, PC/PET, PET/PC/PET and PC/TPU. It is preferable when substrate film D1 is transparent in the spectral region of 400-800 nm.

Very particularly suitable as substrate layer D1 are the mechanically stable thermoplastic polymer substrates made of polyester, in particular those, such as for example polyethylene terephthalate (PET) having a film thickness of <200 µm, more preferably <100 µm and >20 µm, yet more preferably <45 µm and >20 µm, whose adhesion properties have been reduced by surface modification. Various techniques therefor are contemplated. Thus, inorganic gliding additives may be added, for example kaolin, clay, fuller's earth, calcium carbonate, silicon dioxide, aluminium oxide, titanium oxide, calcium phosphate.

To improve the optical properties of such films, trilayer coextrudate films where only the outer layers contain such inorganic gliding additives (e.g. Hostaphan RNK) are also used. It is further also possible to apply silicones (e.g. Hostaphan RN30 2PRK) to the surfaces to reduce surface tension and thus the adhesive properties.

Particular preference is given to silicone-modified PET films (for example Hostaphan RN30 2PRK). The use of these films facilitates the removal of layer D1 even before layer C1 has cured.

Protective Layer C2

Before curing with actinic radiation the protective layer C2 comprises at least one physically drying polymeric resin C2-I, at least one multifunctional acrylate reactive diluent (RD) C2-II and at least one photoinitiator C2-III. It is preferable when the protective layer C2 additionally comprises a UV absorber in an amount of 0.1% to 10% by weight.

The physically drying resins for the protective layer C2 are preferably polyvinyl butyral with $M_w \geq 100\,000$ g/mol or amorphous polymethyl methacrylate with $M_w \geq 100\,000$ g/mol.

The acryloyl-functional reactive diluent is at least one multifunctional acrylate, preferably an at least trifunctional acrylate. Particularly preferred here are either a triacrylate selected from Desmodur® RFE from Covestro AG and hydroxyethyl acrylate (phosphorothioyltris(oxybenzene-4,1-diylcarbamoyloxyethan-2,1-diyl) trisacrylate) and/or pentaerythritol triacrylate and/or quadruply ethoxylated pentaerythritol tetraacrylat, phosphorothioyltris(oxybenzene-4,1-diylcarbamoyloxyethane-2,1-diyl) trisacrylate being particularly preferred.

The employed photoinitiators are typically compounds which are activatable by actinic radiation and can initiate polymerization of the corresponding groups.

Among the photoinitiators a distinction may be made between unimolecular (type I) and bimolecular (type II) initiators for initiating free-radical polymerization; there is extensive prior art concerning this.

Type I photoinitiators (Norrish type I) for free-radical photopolymerization on irradiation form free radicals through unimolecular bond scission.

Examples of type I photoinitiators are triazines, for example tris(trichloromethyl)triazine, oximes, benzoin ethers, benzil ketals, alpha-alpha-dialkoxyacetophenone, phenylglyoxylic esters, bisimidazoles, aroyl phosphinoxides, for example 2,4,6-trimethylbenzoyldiphenylphosphinoxide, sulfonium and iodonium salts.

Type II photoinitiators (Norrish type II) for free-radical polymerization on irradiation undergo a bimolecular reaction, wherein the photoinitiator in the excited state reacts with a second molecule, the coinitiator, and by electron or proton transfer or direct hydrogen abstraction forms the polymerization-initiating free radicals.

Examples of type II photoinitiators are quinones, for example camphorquinone, aromatic keto compounds, for example benzophenone in combination with tertiary amines, alkyl benzophenones, halogenated benzophenones, 4,4'-bis (dimethylamino)benzophenone (Michler's ketone), anthrone, methyl-p-(dimethylamino) benzoate, thioxanthone, ketocoumarins, alpha-aminoalkylphenone, alpha-hydroxyalkylphenone and cationic dyes, for example methylene blue, in combination with tertiary amines.

For the UV and shortwave visible range type I and type II photoinitiators are employed and for the longer wave visible light range predominantly type II photoinitiators are employed.

Preference is given to 1-hydroxycyclohexyl phenyl ketone (e.g. Irgacure® 184 from BASF SE), 2-hydroxy-2-methyl-1-phenyl-1-propanone (e.g. Irgacure® 1173 from BASF SE), 2-hydroxy-1-{4-[4-(2-hydroxy-2-methylpropionyl)benzyl]phenyl}-2-methylpropan-1-one (e.g. Irgacure® 127 from BASF SE), 2-hydroxy-1-[4-(2-hydroxyethoxy) phenyl]-2-methyl-1-propanone (e.g. Irgacure® 2959 from BASF SE); 2,4,6-trimethylbenzoyldiphenylphosphine oxide (e.g. Lucirin® TPO from BASF SE); 2,4,6-trimethylbenzoyldiphenyl phosphinate (e.g. Lucirin® TPO-L from BASF SE), bis(2,4,6-trimethylbenzoyl)phenylphosphine oxide (Lucirin® 819); [1-(4-phenylsulfanylbenzoyl)heptylideneamino] benzoate (e.g. Irgacure® OXE 01 from BASF SE); [I-[9-ethyl-6-(2-methylbenzoyl)carbazol-3-yl]ethylideneamino] acetate (e.g. Irgacure® OXE 02 from BASF SE) and mixtures thereof. Particular preference is given to 2-hydroxy-2-methyl-1-phenyl-1-propanone and 2,4,6-trimethylbenzoyldiphenylphosphine oxide and mixtures thereof.

Typical UV absorbers are benzotriazoles, cyanoacrylates, benzophenones, phenyltriazines, hydroxyphenyltrazines or oxalanilides.

Furthermore, light stabilizers such as phenols or HALS amines may also be present.

In a preferred embodiment the uncured protective layer C2 comprises

I) at least one thermoplastic resin C2 selected from the group consisting of polyvinyl butyral with $M_w \geq 100\,000$ g/mol or amorphous polymethyl methacrylate with $M_w \geq 100\,000$ g/mol, II) at least one multifunctional acrylate reactive diluent C2-II selected from the group consisting of phosphorothioyltris(oxybenzene-4,1-diylcarbamoyloxyethane-2,1-diyl) trisacrylate, pentaerythritol triacrylate and quadruply ethoxylated pentaerythritol tetraacrylate, III) at least one photoinitiator C2-III and IV) optionally assistant and added substances.

Substrate Layer D2

The substrate layer D2 is preferably a thermoplastic substrate layer/substrate film. Materials or material composites of the thermopolastic substrate layer/substrate film D2 are based on polycarbonate (PC), polyethylene terephthalate (PET), amorphous polyesters, polybutylene terephthalate, polyethylene, polypropylene, cellulose acetate, cellulose hydrate, cellulose nitrate, cycloolefin polymers, polystyrene, hydrogenated polystyrene, polyepoxides, polysulfone, thermoplastic polyurethane (TPU), cellulose triacetate (CTA), polyamide (PA), polymethylmethacrylate (PMMA), polyvinyl chloride, polyvinyl acetate, polyvinylbutyral or polydicyclopentadiene or mixtures thereof. They are particularly preferably based on PC, PET, PA, PMMA and CTA. Material composites may be film laminates or coextrudates. Preferred material composites are duplex and triplex films constructed according to one of the schemes A/B, A/B/A or A/B/C. Particularly preferred are PC/PMMA, PC/PA, PC/PET, PET/PC/PET and PC/TPU. It is preferable when substrate film D1 is transparent in the spectral region of 400-800 nm.

Very particularly suitable as substrate layer D2 are the mechanically stable thermoplastic polymer substrates made of polyester, in particular those, such as for example polyethylene terephthalate (PET) having a film thickness of <200 µm, preferably <100 µm and >20 µm, yet more preferably <45 µm and >20 µm, whose adhesion properties have been reduced by surface modification. Various techniques therefor are contemplated. Thus, inorganic gliding additives may be added, for example kaolin, clay, fuller's earth, calcium carbonate, silicon dioxide, aluminium oxide, titanium oxide, calcium phosphate.

To improve the optical properties of such films, trilayer coextrudate films where only the outer layers contain such inorganic gliding additives (e.g. Hostaphan RNK) are also used. It is further also possible to apply silicones (e.g. Hostaphan RN30 2PRK) to the surfaces to reduce surface tension and thus the adhesive properties.

Particularly preferred here are the trilayer coextrudate PET films (for example Hostaphan RNK).

The invention also provides for the use of the layer constructions according to the invention and of the kit of parts according to the invention for the process according to the invention.

In one embodiment the sealed holographic medium according to the invention contains a hologram-containing photopolymer layer having a film thickness of 0.3 µm to 500 µm, preferably of 0.5 µm to 200 µm and particularly preferably of 1 µm to 100 µm.

In particular the hologram may be a reflection, transmission, in-line, off-axis, full-aperture transfer, white light transmission, Denisyuk, off-axis reflection or edge-lit hologram, or else a holographic stereogram, and preferably a reflection, transmission or edge-lit hologram. Preference is given to reflection holograms, Denisyuk holograms, transmission holograms.

In the photopolymer layer one or more holograms may be/may have been photoinscribed at the same location or next to one another. If photoinscribing is performed at the same location different image contents may be photoinscribed. It is likewise possible to photoinscribe different aspects of an object with slightly varying reconstruction angles to form stereograms. It is likewise possible to photoinscribe hidden holograms and microtexts. It is likewise possible in the case of transmission holograms to photoinscribe several light guiding functions and/or light guiding functions for different spectral ranges. Possible optical functions of the holograms correspond to the optical functions of optical elements such as lenses, mirrors, deflecting mirrors, filters, diffusers, directed diffusion elements, diffraction elements, light guides, waveguides, projection screens and/or masks. In addition, a plurality of such optical functions can be combined in such a hologram, for example such that the light is deflected in a different direction according to the incidence of light. For example, it is possible with such constructions to build autostereoscopic or holographic electronic displays which allow a stereoscopic visual impression to be experienced without further aids, for example polarizer or shutter glasses, for use in automobile head-up displays or head-mounted displays.

These optical elements frequently have a specific frequency selectivity according to how the holograms have been exposed and the dimensions of the hologram. This is important especially when monochromatic light sources such as LEDs or laser light are used. For instance, one hologram is required per complementary colour (RGB), in order to deflect light in a frequency-selective manner and at the same time to enable full-colour displays. Therefore in particular display constructions a plurality of holograms are to be irradiated inside one another in the medium.

In addition the sealed holographic media according to the invention may also be used to produce holographic images or representations, for example for personal portraits, biometric representations in security documents, or generally of images or image structures for advertising, security labels, brand protection, branding, labels, design elements, decorations, illustrations, collectable cards, images and the like, and also images which can represent digital data, including in combination with the products detailed above. Holographic images may have the impression of a three-dimensional image, or else can represent image sequences, short films or a number of different objects, according to the angle from which and the light source with which (including moving light sources) etc. they are illuminated. Because of this variety of possible designs, holograms, especially volume holograms, constitute an attractive technical solution for the abovementioned application. It is also possible to use such holograms for storage of digital data, using a wide variety of different exposure methods (shift, spatial or angular multiplexing).

The invention likewise provides an optical display comprising an inventive holographic medium.

Examples of such optical displays are imaging displays based on liquid crystals, organic light-emitting diodes (OLEDs), LED display panels, microelectromechanical systems (MEMS) based on diffractive light selection, electrowetting displays (E-ink) and plasma display screens. Optical displays of this kind may be autostereoscopic and/or holographic displays, transmittive and reflective projection screens, displays with switchable restricted emission characteristics for privacy filters and bidirectional multiuser screens, virtual displays, head-up displays, head-mounted displays, illumination symbols, warning lamps, signal lamps, floodlights/headlights and display panels.

The invention likewise provides autostereoscopic and/or holographic displays, projection screens, displays with switchable restricted emission characteristics for privacy filters and bidirectional multiuser screens, virtual displays, head-up displays, head-mounted displays, illumination symbols, warning lamps, signal lamps, floodlights/headlights and display panels, comprising an inventive holographic medium.

The invention still further provides a security document and a holographic optical element comprising an inventive sealed holographic medium.

In addition, the invention also provides for the use of an inventive holographic medium for production of chip cards, identity documents, 3D images, product protection labels, labels, banknotes or holographic optical elements, especially for visual displays.

EXAMPLES

The invention will now be more particularly elucidated by means of examples.
Test Methods:
Solids content: The reported solids contents were determined according to DIN EN ISO 3251.
colour number: The colour number was determined according to DIN ISO 6271-2:2002 and evaluated as Hazen.
Chemicals:
In each case, the CAS number, if known, is reported in square brackets.
Raw Materials for Photopolymer Layer B
Fomrez® UL 28 Urethanization catalyst, commercial product of Momentive Performance Chemicals, Wilton, Conn., USA.
Borchi® Kat 22 Urethanization catalyst, [85203-81-2] commercial product of OMG Borchers GmbH, Langenfeld, Germany.
BYK-310 silicone-containing surface additive, product of BYK-Chemie GmbH, Wesel, Germany.
Desmodur® N 3900 product of Covestro AG, Leverkusen, DE, hexane diisocyanate-based polyisocyanate, proportion of iminooxadiazinedione at least 30%, NCO content: 23.5%.
CGI-909 tetrabutylammonium tris(3-chloro-4-methylphenyl)(hexyl)borate [1147315-11-4], product of BASF SE
Dye 1 (3,7-bis(diethylamino)phenoxazin-5-ium bis(2-ethylhexyl)sulfosuccinate) was produced as described in WO 2012062655.
Polyol 1 was produced as described in WO2015091427.
Urethane acrylate 1, simultaneously also RD 2, (phosphorothioyltris(oxybenzene-4,1-diylcarbamoyloxyethane-2,1-diyl) trisacrylate, [1072454-85-3]) was produced as described in WO2015091427.
Urethane acrylate 2, (2-({[3-(methylsulfanyl)phenyl]carbamoyl}oxy)ethyl prop-2-enoate, [1207339-61-4]) was produced as described in WO2015091427.
Additive 1, bis(2,2,3,3,4,4,5,5,6,6,7,7-dodecafluoroheptyl)-2,2,4-trimethylhexane-1,6-diyl)biscarbamate [1799437-41-4] was produced as described in WO2015091427.
Raw Materials for Layer C
Physically Drying Resins
Desmocoll 406—resin 1 A linear thermoplastic flexible polyurethane from Covestro Deutschland AG, Leverkusen, Germany.
Desmocoll 400/3—resin 2 A linear thermoplastic flexible polyurethane from Covestro Deutschland AG, Leverkusen, Germany.
Mowital B75H—resin 3 A linear thermoplastic amorphous polyvinyl butyral having an Mw of 240 000 from Kuraray Europe GmbH, Hattersheim, Germany
Degacryl M547—resin 4 A linear thermoplastic amorphous polymethyl methacrylate having an Mw of 500 000 from Evonik Industries, Marl, Germany
Acryloyl-Functional Reactive Diluents
Abbreviation RD=Reactive Diluents
DPHA—RD 1 [29570-58-9] Dipentaerythritol hexaacrylate from Cytec Surface Specialties, Brussels, Belgium.
RD 2 Phosphorothioyltris(oxybenzene-4,1-diylcarbamoyloxyethane-2,1-diyl) trisacrylate, [1072454-85-3]) was produced as described in WO2015091427.
Sartomer SR444D— RD 3 [3524-68-3] Pentaerythritol triacrylate (PETIA) from the SARTOMER Division of CRAY VALLEY, Paris, France (Arkema Group).
Sartomer SR494— RD 4 Quadruply ethoxylated pentaerythritol tetraacrylate (PPTTA) from the SARTOMER Division of CRAY VALLEY, Paris, France (Arkema Group).
Photoinitiators
Esacure One— Initiator 1 [163702-01-0] Oligo[2-hydroxy-2-methyl-1-((4-(1-methylvinyl)phenyl)propanone] from Lamberti S.p.A., Albizzate, Italy.
Irgacure 4265— Initiator 2 A mixture of Irgacure® TPO (50% by weight) and Irgacure® 1173 (50% by weight) from BASF, SE, Ludwigshafen, Germany.
Additives
BYK 333— Flow control agent Silicone-containing surface additive from BYK Chemie GmbH, Wesel, Germany
Solvent
Butyl acetate (BA) Butyl acetate from Brenntag GmbH, Mülheim an der Ruhr, Germany.
Methoxypropanol (MP-ol) 1-Methoxy-2-propanol from Brenntag GmbH, Mülheim an der Ruhr, Germany.
Purification of Urethane Acrylate 1 (Simultaneously Also RD 2):
The 40% solution of urethane acrylate 1 in ethyl acetate has a colour number of 300 to 700 Hazen (DIN ISO 6271-2:2002) which is not acceptable for the optical lacquers based thereon. For purification the solution is diluted with cyclohexane and additional ethyl acetate, the resulting 10% solution is filtered in a solvent mixture of ethyl acetate and cyclohexane (1.4 to 1 parts by weight) through a layer of Kieselgel 60 (Merck) and subsequently the purified original 40% solution in ethyl acetate is re-obtained by distillative removal of cyclohexane and excess ethyl acetate. The thus obtained solution of RD 2 has a colour number of 40-50 Hazen.
Production of Holographic Media (Photopolymer Film)
7.90 g of the above-described polyol component were melted and mixed with 7.65 g of the particular urethane acrylate 2, 2.57 g of the above-described urethane acrylate 1, 5.10 g of the above-described fluorinated urethane, 0.91 g of CGI 909, 0.232 g of dye 1, 0.230 g of BYK 310, 0.128 g of Fomrez UL 28 and 3.789 g of ethyl acetate, so that a clear solution was obtained. This was followed by addition of 1.50 g Desmodure® N 3900 and renewed mixing.

This solution was applied to a PET film of 36 μm in thickness in a roll-to-roll coating plant where by means of a knife coater the product was applied in a wet film thickness of 19 μm. With a drying temperature of 85° C. and a drying time of 5 minutes, the coated film was dried and then protected with a polyethylene film of 40 μm in thickness. This film was then light-tightly packaged.

Production of the Latent Protective Layer C1 on Substrate D1/Protective Layer C2 on Substrate D2

The formulations reported in table 1 were produced when the physically drying resins, dissolved at 100° C. in the reported organic solvent and cooled to room temperature, were mixed with the reactive diluent. The photoinitiators and flow control agents were then added in darkness.

TABLE 1

Coating composition * got producing the latent protective layer C

| Sample | Resin | RD | Resin/RD weight ratio | Solids content (% by weight) Solvent | Viscosity of solution at 23° C. [mPas] |
|---|---|---|---|---|---|
| Inventive examples | | | | | |
| C1-01 | 1 | RD 1 | 30/70 | 25% butyl acetate | 170 |
| C1-02 | 2 | RD 2 | 40/60 | 26% butyl acetate | 1120 |
| C2-01 | 3 | RD 3 | 50/50 | 20% 1-methoxy-2-propanol | 4400 |
| C2-02 | 3 | RD 2 | 20/80 | 28% 1-methoxy-2-propanol | 950 |
| C2-03 | 4 | RD 4 | 25/75 | 25% 1-methoxy-2-propanol | 169 |
| C2-04 | 3 | RD 3 | 47/48# | 20% 1-methoxy-2-propanol | 3020 |
| Noninventive examples | | | | | |
| C1-N01 | 2 | RD5 | 50/50 | 25% butyl acetate | 2220 |

* All coating compositions contain initiator 1 (3.0% by weight based on solids content of lacquer), initiator 2 (1.5% by weight based on solids content of lacquer) and flow control agent (0.2% by weight based on solids content of lacquer);
contains 5% by weight of PGM-ST-UP SiO nanoparticles (Nissan Chemical)

The coating compositions C1-01 and C1-02 for the latent protective layer C1 were applied atop a 36 μm-thick silicone-modified PET film D1 (Hostaphan RN30 2PRK from Mitsubishi Polyester Film GmbH, Wiesbaden, Germany) in a roll-to-roll coating plant by means of a knife coater. With a drying temperature of 85° C. and a drying time of 5 minutes, the coated film was dried and then protected with a polyethylene film of 40 μm in thickness. The coating thickness was generally 15-16 μm. Subsequently, this film was light-tightly packaged.

The coating compositions C2-01, C2-02, C2-03 and C2-04 for the latent protective layer C2 were analogously applied atop a 36 μm-thick PET film D2 (RNK 36 from Mitsubishi Polyester Film GmbH, Wiesbaden, Germany) followed by drying, laminating and packaging. The coating thickness was generally 15-16 μm.

Production of Test Holograms in the Film Composite A-B

The test holograms were prepared as follows: the photopolymer films with the layer construction A-B were in darkness cut to the desired size and using a rubber roller laminated onto a glass sheet having dimensions of 50 mm×70 mm (3 mm thick). The test holograms were produced using a test apparatus which produces Denisyuk reflection holograms using green (532 nm) laser radiation. The test apparatus consists of a laser source, an optical beam guide system and a holder for the glass coupons. The holder for the glass coupons is mounted at an angle of 13° relative to the beam axis. The laser source generated the radiation which, widened to about 5 cm by means of a specific optical beam path, was guided to the glass coupon in optical contact with the mirror. The holographed object was a mirror about 2 cm×2 cm in size, so the wavefront of the mirror was reconstructed on reconstructing the hologram. All examples were irradiated with a green 532 nm laser (Newport Corp, Irvine, Calif., USA, cat. no. EXLSR-532-50-CDRH). A shutter was used to irradiate the recording film in a defined manner for 2 seconds. This forms a film composite A-B* comprising a hologram in layer B.

Subsequently, the samples were placed onto the conveyor belt of a UV source with the B side facing the lamp and irradiated twice at a belt speed of 2.5 m/min. The UV source employed was a Fusion UV "D Bulb" No. 558434 KR 85 iron-doped Hg lamp having a total power density 80 W/cm$^2$. The parameters corresponded to a dose of 2×2.0 J/cm$^2$ (measured with an ILT 490 Light Bug). After this fixing step the film composite A-B' is formed.

Characterization of Test Holograms The holograms in layer B' of the film composite A-B' were then analysed for quality by spectroscopy.

On account of the high diffraction efficiency of the volume hologram, the diffractive reflection of such holograms may be analysed in transmission with visible light with a spectrometer (USB 2000 instrument, Ocean Optics, Dunedin, Fla., USA, is employed) and appears in the transmission spec-trum as a peak with reduced transmission $T_{Red}$. Evaluating the transmission curve makes it possible to determine the quality of a hologram according to ISO standard 17901-1:2015(E) taking account of the following measured values; all results are summarized in table 3 in the section "spectral quality of holograms", column "in A-B":

$T_{Red}=100-T_{peak(A-B')}$ (1) Maximum depth of the transmission peak, this corresponds to the highest diffraction efficiency. Thus, $100-T_{peak(A-B')}$ serves as a measure for the reflection power (or visible "strength" or "quality") of the hologram.

FWHM The width of the transmission peak is determined as "full width at half maximum" (FWHM) in nanometres (nm).

$\lambda_{peak}$ Spectral position of the transmission minimum of the hologram in nanometres (nm).

The films having the layer structure A-B' were then provided with the two successive protective layers C1' and C2' in the process according to the invention. The holograms were then also reana-lysed for quality in the layer construction A-B'-C1'-C2' and compared with the original values for the layer construction A-B' (tab. 3).

Production of a Film Composite with Layer Construction A-B'-C1'-C2'

Production of a film composite with the layer construction A-B'-C1'-C2' comprises lamination of side B' of the film A-B' onto side C1 of the film composite C1-D1. This is effected by pressing together the two films between the temperature controlled rubber rollers of a laminator. The temperature of the rollers was set to 30° C., 60° C. or 90° C. The produced multilayer film was cooled to room temperature. The substrate film D1 was then peeled off from the film composite A-B'-C1-D1. Side C2 of the film composite C2-D2 was then laminated onto side C1 of the film composite A-B'-C1 in analogous fashion.

Subsequently, the samples A-B'-C1-C2-D2 were placed onto the conveyor belt of a UV source with the D2 side facing the lamp and irradiated twice at a belt speed of 2.5 m/min. The UV source employed was a Fusion UV "D Bulb" No. 558434 KR 85 iron-doped Hg lamp having a total power density 80 W/cm$^2$. The parameters corresponded to a dose of 2×2.0 J/cm$^2$ (measured with an ILT 490 Light Bug). After this curing step the film composite A-B'-C1'-C2'-D2 is formed, from which the substrate film D2 is subsequently peeled off.

TABLE 2

Applicability of the protective layer C1 and C2 onto the holographic film A-B and protective quality of coatings C2'

| Sample | Coating composition Layer C1 | Coating composition Layer C2 | $T_{Lam}$ [° C.] | Lamination of layer C1 onto layer B' and removal of film D1 | Lamination of layer C2 onto layer C1/onto layer B' | Removability of film D2 from layer C2' | Adhesion of layer construction B'-C1'-C2' evaluated by cross cut | Solvent resistance (1 h) of layer C2' against NEP/MEK/butanol/EA |
|---|---|---|---|---|---|---|---|---|
| Comparative example | | | | | | | | |
| | none | none | – | – | – | – | – | 5/5/1/5 (after 10 min) |
| Inventive examples | | | | | | | | |
| 01-01 | C1-01 | C2-01 | 60 | + | + | + | 1 | 0/0/0/0 |
| 01-02 | C1-01 | C2-01 | 60 | + | + | + | 1 | 0/0/0/0 |
| 01-03 | C1-01 | C2-01 | 60 | + | + | + | 1 | 0/0/0/0 |
| 02-01 | C1-01 | C2-02 | 60 | + | + | + | 0 | 0/0/0/0 |
| 02-02 | C1-01 | C2-02 | 60 | + | + | + | 0 | 0/0/0/0 |
| 02-03 | C1-01 | C2-02 | 60 | + | + | + | 0 | 0/0/0/0 |
| 03-01 | C1-02 | C2-03 | 60 | + | + | + | 1 | 0/1/0/0 |
| 03-02 | C1-02 | C2-03 | 60 | + | + | + | 1 | 0/1/0/0 |
| 04-01 | C1-02 | C2-04 | 60 | + | + | + | 1 | 0/0/0/1 |
| 04-02 | C1-02 | C2-04 | 60 | + | + | + | 1 | 0/0/0/1 |
| Noninventive examples | | | | | | | | |
| N01 | C1-N01 | C2-01 | 60 | + | – | | | |
| N02 | C1-01 | none | 60 | | + | + | 0 | 2/4/0/2 |
| N03 | C1-02 | none | 60 | | + | + | 1 | 4/4/4/4 |
| N04 | none | C2-01 | 60 | | + | + | 5 | 0/0/0/0 |
| N05 | none | C2-03 | 60 | | + | + | 1 | 0/0/0/0 |
| N06 | none | C2-04 | 30 | | + | + | 5 | 0/0/0/0 |

Table 2 shows that all inventive examples may be readily produced by two successive lamination steps. The noninventive example N01 cannot be produced. Noninventively constructed layer C1 has the result that lamination of layer C2 does not succeed. Further inventive examples N02 to N06 are those comprising only one protective layer, either only C1 or only C2. They may all be readily produced but fail due to inadequate solvent resistance (N02, N03), adhesion (N04, N06) or holographic performance (N05).

Quantitative Analysis of the Adhesion of Protective Layers C1' and C2' and of the Protective Layer Composite C1'-C2' on the Layer B' of the Holographic Film A-B' According to ISO 2409 (Cross Cut Test)

An adhesive tape peel test (adhesive tape used: 3M Scotch 898) with cross cut (as per DIN EN ISO 2409:2013-06) was performed. The performance values range from full adhesion (performance value: 0) to inadequate adhesion (performance value: 5).

Evaluation of Solvent Resistance of Protective Layer C2' or C1'

The solvent resistance of the coatings was typically tested with technical quality N-ethyl-2-pyrrolidone (NEP), methyl ethyl ketone (MEK), 1-butanol and ethyl acetate (EA). The solvents were applied to the coating with a soaked cotton bud and protected from vaporization by covering. Unless stated otherwise, a contact time of 60 minutes at about 23° C. was observed. After the end of the contact time, the cotton bud is removed and the test surface is wiped clean with a soft cloth. The inspection is immediately effected visually and after gentle scratching with a fingernail.

A distinction is made between the following levels:
 0=unchanged; no change visible; not damageable by scratching.
 1=slight swelling visible, but not damageable by scratching.
 2=change clearly visible, barely damageable by scratching.
 3=noticeable change, surface destroyed after firm fingernail pressure.
 4=severe change, scratched through to substrate after firm fingernail pressure.
 5=destroyed; lacquer already destroyed on wiping off the chemical; the test substance is not removable (eaten into surface).

Within this assessment, the test is typically passed with performance values of 0 and 1. Performance values of >1 represent a "fail".

As is shown by the corresponding column of table 2 all inventive coatings C2' register a very high level of solvent resistance.

Samples N04 to N06, wherein layer C2' is applied directly atop A-B' without an interlayer C1', show equally good values. Such samples fail due to inadequate adhesion (N04 and N06) or holographic performance (N05).

Samples N02 and N03, wherein the layers C1' are not covered with the layers C2', show insufficient solvent resistance.

Characterization of Test Holograms

The holograms in layer B' of the film composite A-B' which are initially measured before application of any protective layers are analysed by spectroscopy for possible loss of quality in the layer composite A-B'-C1'-C2'.

TABLE 3

Quality of holograms inscribed in A-B film composite then UV-VIS-fixed; this forms the film composite A-B'; this is followed by lamination of C1-D1 and removal of D1; this is followed by lamination of film composite C2-D2; then the film composite A-B'-C1-C2-D2 is fixed by irradiation to afford the film composite A-B'-C1'-C2'-D2 and then, by removal of D2, the film composite A-B'-C1'-C2'

| | Coating composition | | $T_{Lam}$ [°C.] | Spectral quality of holograms | | | | | | | | | | |
|---|---|---|---|---|---|---|---|---|---|---|---|---|---|---|
| | | | | in A-B' | | | in A-B'-C1'-C2' (after 1 h) | | | | in A-B'-C1'-C2' (after 3 days) | | | |
| | | | | | | | | | | Δ | | | | Δ |
| Sample | Layer C1 | Layer C2 | | 100-$T_{peak}$ [%] | FWHM [nm] | $\lambda_{peak}$ [nm] | 100-$T_{min}$ [%] | FWHM [nm] | $\lambda_{peak}$ [nm] | $\lambda_{peak}$ [nm] to A-B' | 100-$T_{peak}$ [%] | FWHM [nm] | $\lambda_{peak}$ [nm] | $\lambda_{peak}$ [nm] to A-B' |
| Inventive examples | | | | | | | | | | | | | | |
| 01-01 | C1-01 | C2-01 | 60 | 92.9 | 23.9 | 528 | 85.6 | 18.0 | 533 | 4.5 | 84.1 | 17.3 | 527 | −1.4 |
| 01-02 | C1-01 | C2-01 | 60 | 93.6 | 23.8 | 528 | 89.1 | 17.2 | 536 | 7.9 | 86.6 | 18.9 | 528 | 0.0 |
| 01-03 | C1-01 | C2-01 | 60 | 91.4 | 24.2 | 528 | 89.0 | 17.5 | 536 | 7.9 | 81.1 | 15.7 | 525 | −3.1 |
| 02-01 | C1-01 | C2-02 | 60 | 90.4 | 23.4 | 529 | 88.0 | 19.1 | 535 | 6.6 | 83.8 | 18.8 | 525 | −3.8 |
| 02-02 | C1-01 | C2-02 | 60 | 89.7 | 23.4 | 529 | 89.6 | 18.4 | 539 | 10.1 | 85.5 | 16.8 | 530 | 1.4 |
| 02-03 | C1-01 | C2-02 | 60 | 92.5 | 22.9 | 528 | 89.2 | 18.3 | 534 | 5.9 | 88.0 | 17.9 | 527 | −1.0 |
| 03-01 | C1-02 | C2-03 | 60 | 91.9 | 21.7 | 529 | 90.1 | 18.4 | 538 | 8.6 | 91.2 | 21.3 | 537 | 8.3 |
| 03-02 | C1-02 | C2--03 | 60 | 91.9 | 22.0 | 529 | 93.2 | 19.1 | 538 | 9.0 | 90.7 | 20.8 | 536 | 7.3 |
| 04-01 | C1-02 | C2-04 | 60 | 93.8 | 21.6 | 529 | 92.9 | 19.7 | 532 | 3.1 | 92.4 | 20.5 | 530 | 1.3 |
| 04-02 | C1-02 | C2-04 | 60 | 91.5 | 24.3 | 529 | 94.0 | 19.52 | 536 | 7.3 | 91.9 | 20.6 | 534 | 5.9 |
| Noninventive examples | | | | | | | | | | | | | | |
| N01 | C1-N01 | C2-01 | 60 | 93.0 | 19.9 | 529 | — | — | — | — | — | — | — | — |
| N02 | C1-01 | none | 60 | 90.9 | 24.0 | 528 | 90.5 | 18.6 | 530 | 1.4 | 90.5 | 18.7 | 526 | −2.1 |
| N03 | C1-02 | none | 60 | 94.3 | 20.9 | 529 | 94.2 | 19.9 | 533 | 4.2 | 91.7 | 19.3 | 532 | 3.1 |
| N04 | none | C2-01 | 60 | 93.2 | 23.0 | 528 | 88.9 | 19.8 | 544 | 16.3 | 91.9 | 19.9 | 542 | 14.2 |
| N05 | none | C2-03 | 60 | 79.2 | 20.3 | 529 | 47.0 | 32.5 | 557 | 28.4 | 31.8 | 159.7[#] | 549 | 19.7 |
| N06 | none | C2-04 | 60 | 91.7 | 22.0 | 526 | 87.4 | 21.9 | 534 | 8.0 | 84.0 | 22.5 | 534 | 7.3 |

[#]spectral peak nonuniform, several additional peaks

The values of $T_{Red}=100-T_{peak(A-B'-C1'-C2')}$ (2) for the inventive examples differ only minimally from the corresponding values for A-B' and only in individual cases is a deviation of about 10% observed. A large loss in hologram quality is recorded only for the noninventive example N05.

The same tendency also affects the spectral position of the transmission peak $\lambda_{peak}$. As is shown by the difference $$\Delta\lambda_{peak}=\lambda_{peak(A-B'-C1'-C2')}-\lambda\text{peak}_{(A-B')} \quad (3)$$

the deviation from $\lambda_{peak}$ is not more than 10 nm. Some noninventive examples (N04 and N05) show substantially higher values.

The invention claimed is:

1. A sealed holographic medium comprising a layer construction B'-C1'-C2', wherein B' is a photopolymer layer containing a volume hologram, C1' is a protective layer at least partly cured by actinic radiation obtained by reaction of
   I) at least one thermoplastic mainly linear and semicrystalline polyurethane resin C1-I,
   II) at least one multifunctional acrylate reactive diluent C1-II, and
   III) at least one photoinitiator C1-III
and
C2' is a protective layer at least partly cured by actinic radiation obtainable by reaction of
   I) at least one thermoplastic resin C2-I selected from the group consisting of polyvinyl butyral and polymethyl methacrylate,
   II) at least one multifunctional acrylate reactive diluent C2-II, and
   III) at least one photoinitiator C2-III.

2. The sealed holographic medium according to claim 1, wherein the layer construction according to the invention consists of at least four layers at least partly joined to one another, wherein the layers are arranged directly atop one another in the sequence substrate layer A, photopolymer layer B', cured protective layer C1' and cured protective layer C2'.

3. The sealed holographic medium according to claim 1, wherein the layer construction consists of at least four layers at least partly joined to one another, wherein the layers are arranged directly atop one another in the sequence photopolymer layer B', cured protective layer C1', cured protective layer C2' and substrate layer D2.

4. The sealed holographic medium according to claim 1, wherein the layer construction consists of at least five layers at least partly joined to one another, wherein the layers are arranged directly atop one another in the sequence substrate layer A, photopolymer layer B', cured protective layer C1', cured protective layer C2' and substrate layer D2.

5. A layer construction comprising a curable protective layer C1 and an areal substrate layer D1 at least partly joined to the protective layer C1, wherein the protective layer C1 comprises
   I) at least one thermoplastic mainly linear and semicrystalline polyurethane resin C1-I,
   II) at least one multifunctional acrylate reactive diluent C1-II, and
   III) at least one photoinitiator C1-III.

6. A process for producing the sealed holographic medium according to claim 1, wherein initially an uncured protective layer C1 is applied atop a photopolymer layer B' containing a volume hologram to afford a layer composite B'-C1, in a further step an uncured protective layer C2 is applied atop the protective layer C1 to afford a layer composite B'-C1-C2 and subsequently the layer composite B'-C1-C2 is at least partly cured with actinic radiation to obtain a layer composite B'-C1'-C2', wherein C1' and C2' are the at least partly cured protective layers C1 and C2 respectively, wherein the uncured protective layer C1 comprises I) at least one thermoplastic mainly linear and semicrystalline polyurethane resin C1-I,
II) at least one multifunctional acrylate reactive diluent C1-II, and
III) at least one photoinitiator C1-III
and
the uncured protective layer C2 comprises
I) at least one thermoplastic resin C2-I selected from the group consisting of polyvinyl butyral and polymethyl methacrylate,
II) at least one multifunctional acrylate reactive diluent C2-II, and
III) at least one photoinitiator C2-III.

7. The process according to claim 6, wherein in a first step a layer composite A-B' is provided, wherein A is a substrate layer and B' is the photopolymer layer containing the volume hologram, in a second step the uncured protective layer C1 is applied atop a substrate layer D1 to afford a layer composite C1-D1, in a third step the layer composite A-B' is areally joined to the layer composite C1-D1 to afford a layer composite A-B'-C1-D1, in a fourth step the substrate layer D1 is removed from the layer composite A-B'-C1-D1 to afford a layer composite A-B'-C1, in a fifth step the uncured protective layer C2 is applied atop a substrate layer D2 to afford a layer composite C2-D2, in a sixth step the layer composite A-B'-C1 is areally joined to the layer composite C2-D2 to afford a layer composite A-B'-C1-C2-D2, and in a seventh step the layer composite A-B'-C1-C2-D2 is at least partly cured with actinic radiation to afford a layer composite A-B'-C1'-C2'-D2.

8. The process according to claim 7, wherein in an eighth step the substrate layer D2 is removed from the layer composite A-B'-C1'-C2'-D2 to afford a layer composite A-B'-C1'-C2'.

9. A kit of parts containing at least one uncured protective layer C 1, at least one uncured protective layer C2 and an areal photopolymer layer B' containing a volume hologram, wherein the protective layers C1 and C2 are different.

10. The kit of parts according to claim 9, wherein the photopolymer layer B' is disposed on a substrate layer A, wherein the photopolymer layer B' is on one side at least partly joined to the substrate layer A.

11. The kit of parts according to claim 9, wherein the uncured protective layer C1 is disposed on a substrate layer D1, wherein the protective layer C1 is on one side at least partly joined to the substrate layer D1 , and the uncured protective layer C2 is disposed on a substrate layer D2, wherein the protective layer C2 is on one side at least partly joined to the substrate layer D2.

12. A method comprising utilizing the layer construction according to claim 5 to produce a sealed holographic medium.

13. An optical display comprising the sealed holographic medium according to claim 1, wherein the optical display is selected from the group consisting of autostereoscopic and/or holographic displays, projection screens, displays with switchable restricted emission characteristics for privacy filters and bidirectional multiuser screens, virtual displays, head-up displays, head-mounted displays, illumination symbols, warning lamps, signal lamps, floodlights/headlights and display panels.

14. A security document comprising the sealed holographic medium according to claim 1.

* * * * *